(12) United States Patent
Lee et al.

(10) Patent No.: US 9,439,215 B2
(45) Date of Patent: Sep. 6, 2016

(54) METHOD FOR SETTING OPERATING CHANNEL IN WHITE SPACE BAND AND DEVICE THEREFOR

(71) Applicant: LG Electronics Inc., Seoul (KR)

(72) Inventors: Wookbong Lee, Gyeonggi-do (KR); Suhwook Kim, Gyeonggi-do (KR); Jimsam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/390,090

(22) PCT Filed: Mar. 27, 2013

(86) PCT No.: PCT/KR2013/002543
§ 371 (c)(1),
(2) Date: Oct. 2, 2014

(87) PCT Pub. No.: WO2013/151268
PCT Pub. Date: Oct. 10, 2013

(65) Prior Publication Data
US 2015/0063332 A1 Mar. 5, 2015

Related U.S. Application Data

(60) Provisional application No. 61/637,272, filed on Apr. 24, 2012, provisional application No. 61/619,922, filed on Apr. 3, 2012.

(51) Int. Cl.
*H04W 4/00* (2009.01)
*H04W 74/00* (2009.01)
(Continued)

(52) U.S. Cl.
CPC ........... *H04W 74/002* (2013.01); *H04W 16/14* (2013.01); *H04W 72/02* (2013.01); *H04W 84/12* (2013.01)

(58) Field of Classification Search
CPC .......... H04W 74/002; H04W 74/004; H04W 74/006; H04W 72/02; H04W 72/0453; H04W 16/14; H04W 84/12
See application file for complete search history.

(56) References Cited

U.S. PATENT DOCUMENTS

| 2011/0164186 A1* | 7/2011 | Sadek ............... H04H 20/33 348/724 |
| 2011/0188486 A1 | 8/2011 | Kim et al. |

(Continued)

FOREIGN PATENT DOCUMENTS

| KR | 10-2011-0089802 A | 8/2011 |
| WO | 2011/085026 A2 | 7/2011 |

(Continued)

OTHER PUBLICATIONS

International Search Report issued in corresponding International Patent Application No. PCT/KR2013/002543 dated Jul. 26, 2013.
(Continued)

*Primary Examiner* — Kevin Mew
(74) *Attorney, Agent, or Firm* — Morgan, Lewis & Bockius LLP

(57) ABSTRACT

Provided are a method and a device for setting an operating channel in a white space band. A method of setting an operating channel in a white space band by a device includes: receiving, by the device, a White Space Map including information on an available TV channel and an offset value in the available TV channel, and setting, by the device, the operating channel based upon the information of the available TV channel and the offset value from the available TV channel, wherein the offset value indicates a shifted amount of a center frequency of the operating channel from the center frequency of the available TV channel.

10 Claims, 16 Drawing Sheets

(51) Int. Cl.
*H04W 72/02* (2009.01)
*H04W 16/14* (2009.01)
*H04W 84/12* (2009.01)

(56) References Cited

U.S. PATENT DOCUMENTS

| | | | | |
|---|---|---|---|---|
| 2012/0039284 A1* | 2/2012 | Barbieri | ............... | H04W 48/10 370/329 |
| 2012/0170534 A1* | 7/2012 | Kim | ............... | H04H 20/42 370/329 |
| 2012/0184318 A1* | 7/2012 | Lee | ............... | H04W 16/14 455/515 |
| 2012/0307685 A1* | 12/2012 | Kim | ............... | H04W 48/16 370/255 |
| 2013/0003679 A1 | 1/2013 | Seok et al. | | |
| 2013/0177007 A1* | 7/2013 | Lee | ............... | H04W 84/12 370/338 |
| 2013/0267237 A1* | 10/2013 | Kim | ............... | H04W 72/04 455/450 |
| 2014/0004872 A1* | 1/2014 | Li | ............... | H04W 16/14 455/454 |
| 2014/0065975 A1* | 3/2014 | Schmidt | ............... | H04W 16/14 455/67.11 |
| 2014/0199992 A1* | 7/2014 | Chincholi | ............... | H04W 16/14 455/422.1 |
| 2014/0254540 A1* | 9/2014 | Kim | ............... | H04W 72/02 370/329 |
| 2014/0295867 A1* | 10/2014 | Newton | ............... | H04W 28/20 455/452.1 |
| 2015/0043471 A1* | 2/2015 | Rinne | ............... | H04L 5/0053 370/329 |
| 2015/0078346 A1* | 3/2015 | Farhadi | ............... | H04W 16/14 370/336 |
| 2015/0139099 A1* | 5/2015 | Lee | ............... | H04W 72/00 370/329 |
| 2015/0139115 A1* | 5/2015 | Seok | ............... | H04W 16/14 370/329 |
| 2015/0257152 A1* | 9/2015 | Hasegawa | ............... | H04W 16/14 370/329 |

FOREIGN PATENT DOCUMENTS

WO  2011/099719 A2  8/2011
WO  2011/122763 A2  10/2011

OTHER PUBLICATIONS

International Search Report and Written Opinion issued in corresponding International Patent Application No. PCT/KR2013/002543 dated Jul. 26, 2013.

* cited by examiner

METHOD FOR SETTING OPERATING CHANNEL IN WHITE SPACE BAND AND DEVICE THEREFOR

FIELD OF THE INVENTION

The present invention relates to a wireless access system and, most particularly, to a method for setting an operating channel in a white space band and a device for supporting the same.

BACKGROUND ART

A standard for a wireless local area network (WLAN) technology is being developed as an IEEE (Institute of Electrical Engineering and Electronics Engineers) 802.11 standard. IEEE 802.11a and b use an unlicensed band at 2.4. GHz or 5 GHz, and IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps with respect to 4 spatial streams by applying Multiple Input Multiple Output-OFDM (MIMO-OFDM) at 2.4 GHz. The IEEE 802.11n supports a channel bandwidth of up to 40 MHz, and, in this case, a transmission rate of 600 Mbps is provided.

Currently, an IEEE 802.11af standard for regulating operations of an unlicensed device in a TV whitespace (TVWS) band is being developed.

As a frequency being allocated for TV broadcasting, a TV White Space band includes a UHF (Ultra High Frequency) band and a VHF (very high frequency) band, and the TV White Space band signifies a frequency band that is authorized to use an unlicensed device under a condition that the usage of the unlicensed device does not impede (or hinder) the communication of a licensed device operating the corresponding frequency band. More specifically, a device that is being operated as an unlicensed device may use an available channel or available frequency band that is not being used by the licensed device in the corresponding frequency band. Herein, licensed devices may include TVs, wireless microphones, and so on, and a licensed device may also be referred to as a licensed user, an incumbent user, or a primary user, and so on.

An unlicensed device that wishes to use a TV WS band is required to provide a protection (or guard) function respective to a licensed device. Therefore, in order to acquire available channel information before initiating transmission of a signal in the TV WS band, the unlicensed device must verify whether or not a licensed device is occupying the corresponding band.

In order to do so, the unlicensed device may verify whether or not a licensed device is occupying the corresponding band by performing spectrum sensing. A spectrum sensing mechanism includes an Energy Detection method (a method determining that a high-priority user is using the corresponding band, when an intensity of a received signal is greater than or equal to a predetermined value), a Feature Detection method (a method determining that a high-priority user is using the corresponding band, when a digital TV Preamble is detected), and so on. When an intensity of a signal received in a specific channel is greater than or equal to a predetermined value, or when digital TV Preamble is detected, the unlicensed device may determine that a licensed device is currently using the specific channel. Additionally, when it is determined that a licensed device is currently using a channel that is immediately neighboring the channel that is currently being used, occasionally, depending upon the level of interference being radiated to the neighboring band, the transmission power of the unlicensed device may be required to be reduced.

However, in the TV WS band, in case the unlicensed device depends only upon frequency sensing in order to acquire the available channel information, more load caused by the sensing process for performing operations may be added to the unlicensed device, thereby causing delay in the procedure. Accordingly, the unlicensed device may acquire available channel list information within a corresponding region, by accessing a geo-location database through the internet or a dedicated network.

DETAILED DESCRIPTION OF THE INVENTION

Technical Objects

An object of the present invention is to propose a method for easily setting an operating channel in a white space band in a wireless communication system, and preferably, in a WLAN (Wireless Local Area Network) system supporting operations in a white space band and a device for the same.

Additionally, an object of the present invention is to propose a method for easily setting an operating channel and a device for the same, when the conventional WLAN system is operating at a white space band by a channel having its frequency bandwidth decreased due to down-clocking.

The technical objects of the present invention will not be limited only to the technical objects described above. Accordingly, technical objects that have not been mentioned above or additional technical objects of the present application may become apparent to those having ordinary skill in the art from the description presented below.

Technical Solutions

According to an aspect of the present invention, as a method of a device for setting an operating channel in a white space band, the method for setting an operating channel includes a step of receiving a White Space Map, the White Space Map including information on an available TV channel and an offset value from the available TV channel and a step of setting the operating channel based upon the information of an available TV channel and the offset value from the available TV channel, and an offset value may indicate a shifted amount of a center frequency of the operating channel from a center frequency of the available TV channel.

According to another aspect of the present invention, as a device setting an operating channel in a white space band, the device includes a RF (Radio Frequency) unit configured to transmit and receive a radio signal and a processor configured to receive a White Space Map, the White Space Map including information on an available TV channel and an offset value from an available TV channel, and to set an operating channel based upon the information of the available TV channel and the offset value from the available TV channel, and an offset value may indicate a shifted amount of a center frequency of the operating channel from a center frequency of the available TV channel.

Preferably, a shifted amount may be decided in basic frequency units as a multiple the offset value.

Preferably, a basic frequency unit may be decided as a bandwidth of the TV channel and a minimum frequency bandwidth supported by the operating channel.

Preferably, a basic frequency unit may be decided as (N−B)/2. Herein, N represents a bandwidth of the TV channel, and B corresponds to a minimum frequency bandwidth supported by an operating channel.

Preferably, partial bits of a bit sequence representing information on an available TV channel may indicate the offset value.

Advantageous Effects

According to an exemplary embodiment of the present invention, an operating channel in a white space band may be easily set in a wireless communication system, and preferably, in a WLAN (Wireless Local Area Network) system supporting operations in a white space band.

Additionally, according to an exemplary embodiment of the present invention, an operating channel may be easily set, when the conventional WLAN system is operating at a white space band by a channel having its frequency bandwidth decreased due to down-clocking.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

BEST MODE FOR CARRYING OUT THE PRESENT INVENTION

Figure 1:
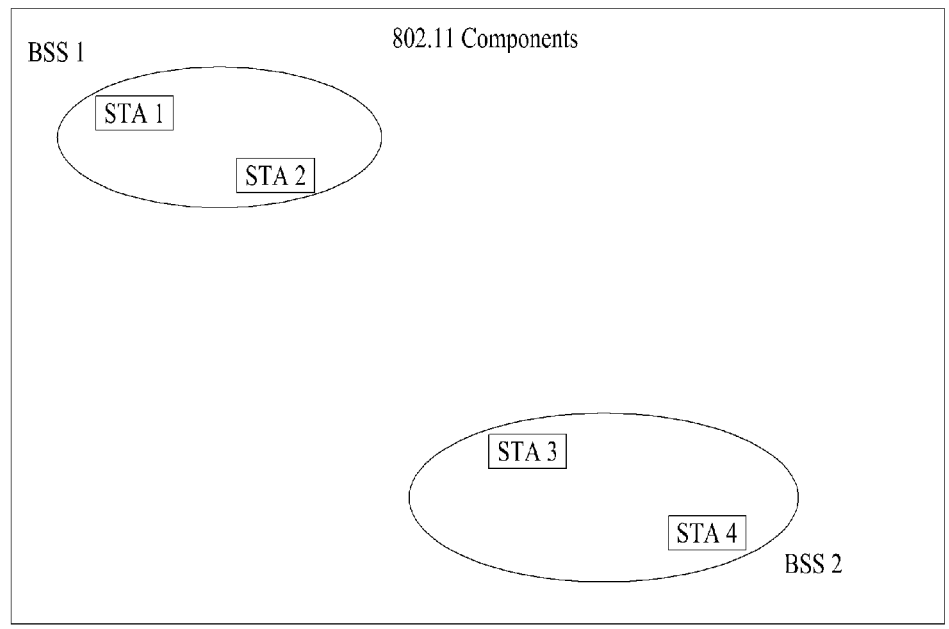
FIG. 1 illustrates an exemplary structure of an IEEE 802.11 system to which the present invention may be applied.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

The specific terms used in the following description of the present invention are provided to facilitate the understanding of the present invention. And, therefore, without deviating from the technical scope and spirit of the present invention, such specific terms may also be varied and/or replaced by other terms.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention, may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon an IEEE 802.11 system. Nevertheless, the technical features of the present invention will not be limited only to those of the IEEE 802.11 system.

1. IEEE 802.11 System to which the Present Invention can be Applied 1.1. General System FIG. 1 illustrates an exemplary structure of an IEEE 802.11 system to which the present invention may be applied.

An IEEE 802.11 structure may be configured of multiple elements, and a WLAN supporting STA mobility, which is transparent with respect to a higher layer, may be provided due to an interaction between the multiple elements. A BBS (Basic Service Set) may correspond to a basic configuration block in an IEEE 802.11 LAN. FIG. 1 shows an example, wherein two BSSs (BSS1 and BSS2) exist, and wherein two STAs are included as members of each BSS (STA1 and STA2 being included in BSS1, and STA3 and STA4 being included in BSS2). In FIG. 1, an oval shape (or ellipse) indicating the BSS may also be understood as a mark indicating a coverage area in which the STAs included in the corresponding BSS maintain communication. This area may be referred to as a BSA (Basic Service Area). When an STA travels outside of the BSA, the corresponding STA may not be capable of directly performing communication with other STAs within the corresponding BSS.

In the IEEE 802.11 LAN, a most basic type of BSS corresponds to an IBSS (Independent BSS). For example, an IBSS may have a minimum form consisting only on 2 STAs. Additionally, the BSS (BSS1 or BSS2) of FIG. 1, which has the simplest format, and wherein other elements are omitted, may correspond to a typical example of the IBSS. Such configuration is available (or possible) in a case when the STAs can perform direct communication between one another. Additionally, instead of being planned in advance and then configured, a LAN having the above-described configuration may be configured when a LAN is being required, and this may be referred to as an ad-hoc network.

Membership of an STA in a BSS may be dynamically changed due to a turning on or turning off of an STA, a moving in or moving out of the STA to or from a BSS area, and so on. In order to allow an STA to become a member of the BSS, the STA may join a corresponding BSS by using a synchronization procedure. In order to access all services of a BSS infrastructure, the STA should be associated to the BSS. Such association may be dynamically set and may also include the usage of a DSS (Distribution System Service).

Figure 2:
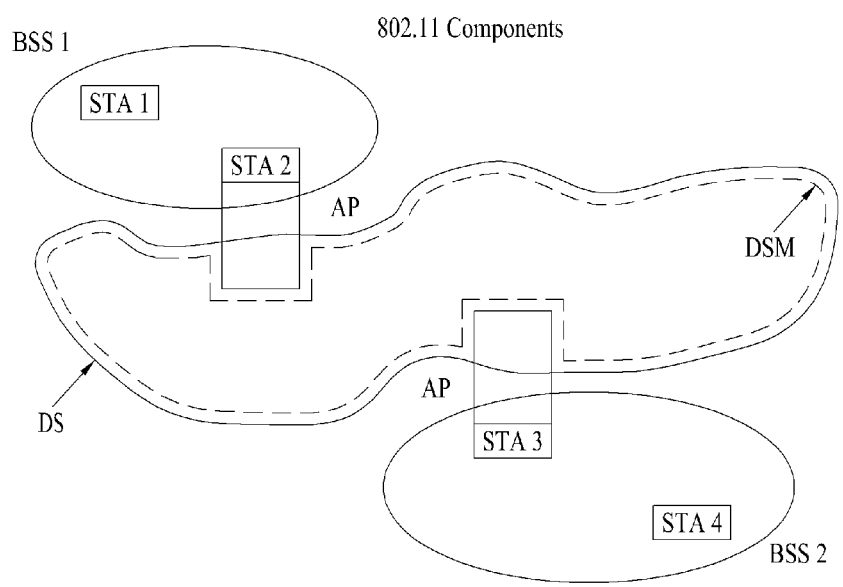
FIG. 2 illustrates another exemplary structure of an IEEE 802.11 system to which the present invention may be applied.

FIG. 2 illustrates another exemplary structure of an IEEE 802.11 system to which the present invention may be applied. FIG. 2 corresponds to a format wherein elements, such as a DS (Distribution System), DSM (Distribution System Medium), AP (Access Point), and so on, are added to the structure of FIG. 1.

In the LAN, a direct station-to-station distance may be limited by a PHY performance. In some case, such limitation in the distance may be sufficient, however, in some cases, communication between stations at longer distances may also be required. In order to support an extended coverage, a distribution system (DS) may be configured.

A DS signifies a structure having BSSs interconnected to one another. More specifically, instead of having the BSS exist independently, as shown in FIG. 1, the BSS may also exist as an extended element of a network consisting of multiple BSSs.

A DS corresponds to a logical concept and may be specified by characteristics of a distribution system medium (DSM). Accordingly, in the IEEE 802.11 standard, a WM (Wireless Medium) and a Distribution System Medium (DSM) are logically differentiated from one another. Each of the logical media is used for a different purpose and used by different elements. In the definition of the IEEE 802.11 standard, the media are not limited to be identical to one another not limited to be different from one another. As described above, in light of the characteristics that multiple media are logically different from one another, flexibility of the IEEE 802.11 LAN structure (DS structure or other network structures) may be described. More specifically, the IEEE 802.11 LAN structure may be diversely embodied, and the corresponding LAN structure may be independently specified by physical characteristics of each exemplary embodiment.

By providing a seamless integration of multiple BSSs, and by providing logical services required for handling an address designated to a destination, the DS may support a mobile device.

An AP signifies an entity enabling access to the DS through a WM with respect to the associated STAs and having STA functionality. Data transport may be performed between the BSS and the DS through the AP. For example, STA2 and STA3 shown in FIG. 2 have the functionality of an STA and provide functions enabling associated STAs (STA1 and STA4) to access the DS. Accordingly, since all APs basically correspond to an STA, all APs correspond to addressable entities. The address that is being used by an AP for communication within a WM is not required to be identical to the address that is being used by an AP for communication within a DSM.

Data being transmitted from one of the STAs, which are associated to the AP, to the STA address of the corresponding AP may always be received by an uncontrolled port and may be processed by an IEEE 802.1X port access entity. Additionally, when a controlled port is authenticated, transmission data (or frame) may be delivered to the DS.

Figure 3:
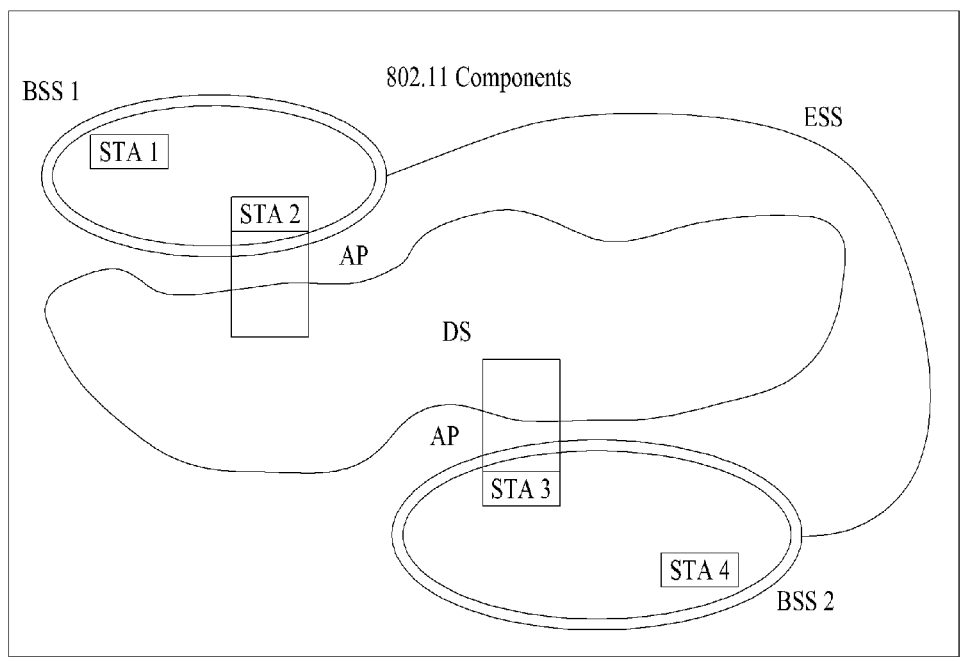
FIG. 3 illustrates yet another exemplary structure of an IEEE 802.11 system to which the present invention may be applied.

FIG. 3 illustrates yet another exemplary structure of an IEEE 802.11 system to which the present invention may be applied. In addition to the structure of FIG. 2, FIG. 3 conceptually illustrates an ESS (Extended Service Set) for providing a broader coverage.

A wireless network having an arbitrary size and complexity may consist of a DS and BSSs. In an IEEE 802.11 system, such type of network is referred to as an ESS network. However, the ESS does not include a DS. A characteristic feature of an ESS network is that the ESS network appears to be an IBSS network in an LLC (Logical Link Control) layer. STAs that are included in the ESS may communicate with one another, and mobile STAs may move transparently to the LLC from one BSS to another BSS (within the same ESS).

In the IEEE 802.11, nothing is assumed with respect to relative physical positions of the BSSs shown in FIG. 3, and all of the following forms are available. The BSSs may partially overlay one another, and this corresponds to a form that is generally used in order to provide continuous (or contiguous) coverage. Additionally, the BSSs may not be physically connected to one another, and, logically, the distance between the BSSs is not limited. Moreover, the BSSs may physically be located at identical positions, and this may be used in order to provide redundancy. Furthermore, one (or one or more) IBSS or ESS networks may physically exist in the same space as one (or one or more) ESS network. This may correspond to an ESS network form, in a case when an ad-hoc network is being operated in a position where an ESS network exists, or in a case when physically overlaying IEEE 802.11 networks are configured by different organizations, or in a case when two or more different access and security policies are being required in the same position.

Figure 4:
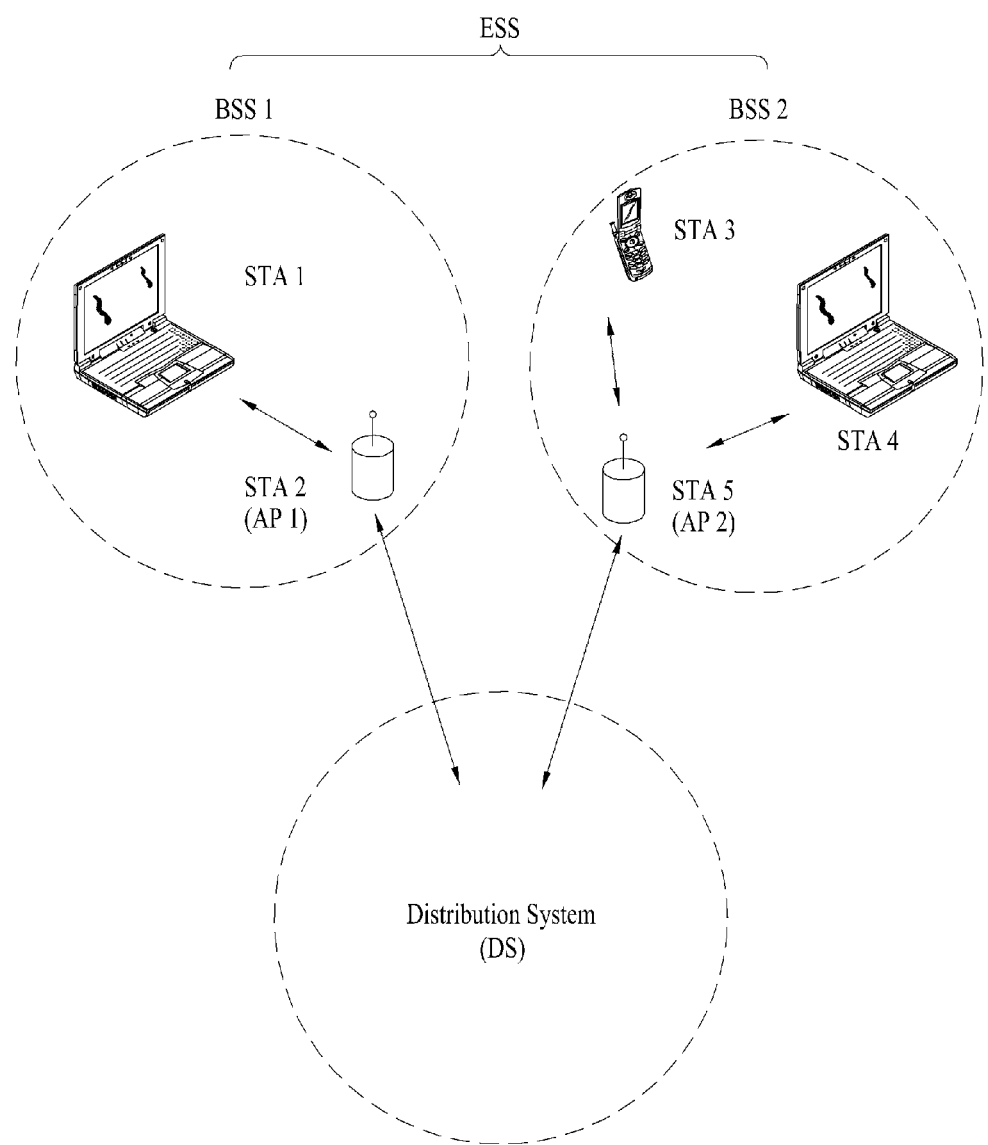
FIG. 4 illustrates an exemplary structure of a WLAN system.

FIG. 4 illustrates an exemplary structure of a WLAN system. FIG. 4 shows an example of an infrastructure BSS including a DS.

In the example shown in FIG. 4, BSS1 and BSS2 configure the ESS. In a WLAN system, the STA corresponds to a device that operates in accordance with MAC/PHY regulations of IEEE 802.11. The STA includes an AP STA and a non-AP STA. The non-AP STA generally corresponds to devices that are directly operated by the user, such as laptop computers, mobile phones, and so on. In the example of FIG. 4, STA1, STA3, and STA4 correspond to the non-AP STA, and STA2 and STA5 correspond to the AP STA.

In the following description, the non-AP STA may also be referred to as a terminal, a WTRU (Wireless Transmit/Receive Unit), a UE (User Equipment), a MS (Mobile Station; MS), a Mobile Terminal, a MSS (Mobile Subscriber Station; MSS), and so on. Additionally, the AP corresponds to a concept respective to a BS (Base station; BS), Node-B, eNB (evolved Node-B), BTS (Base Transceiver System; BTS), Femto base station (Femto BS), and so on.

1.2. IEEE 802.11af

An IEEE 802.11af standard for regulating operations of an unlicensed device in a TVWS (TV whitespace) band is being developed.

As a frequency being allocated for TV broadcasting, a TV White Space band includes a UHF (Ultra High Frequency) band and a VHF (very high frequency) band, and the TV White Space band signifies a frequency band that is authorized to use an unlicensed device under a condition that the usage of the unlicensed device does not impede (or hinder) the communication of a licensed device operating the corresponding frequency band.

The TVWS band for each region or the bandwidths of each TV channel (or TV band) within the TVWS band may be different from one another. For example, in the United States of America, services are provided at VHF and UHF channel bands (54-60 MHz, 76-88 MHz, 174-216 MHz, 512-608 MHz, and 614-698 MHz bands) as the TVWS band, and the bandwidth of one TV channel is respectively defined as 6 MHz. Additionally, in the United Kingdom, services are provided at UHF TV channel bands (480-790 MHz bands excluding 550-614 MHz) as the TVWS band, and the bandwidth of one TV channel is respectively defined as 8 MHz.

In the TVWS, in order to operate an unlicensed device (e.g., STA of a WLAN system), a protection (or guard) scheme respective to a licensed device (or higher priority user) should be provided beforehand. Therefore, since the STA is not used by the licensed device, the STA should be operated within an available channel after finding out the available channel that can be used by the unlicensed device. If the channel that is currently being used by the STA is no longer an available channel, the usage of the corresponding channel is stopped.

In order to determine channel availability in the TVWS, the STA may figure out a TV channel schedule by performing spectrum sensing or by accessing a GDB (geo-location database). The GDB may also be referred to as a WDB (whitespace database). GDB information may include information may include information on a specific channel usage schedule (i.e., channel usage time) of a licensed device at a specific location. An STA that wishes to determine the availability of a TV channel is required to acquire GDB information based upon its own position information after accessing the GDB through the internet, and so on, and this should be performed at a time unit that is sufficient for protecting (or guarding) the licensed device.

In the current IEEE 802.11af standard, two types of devices are broadly defined. More specifically, the device types are divided into, as a device that can directly access (or that can be directly connected to) the GDB, an enabling device, which is configured to acquire specified operation parameters at a geo-location where the device is located by accessing the GDB, and, as a device that cannot directly access the GDB, a dependent device, which is configured to acquire specified operation parameters at a geo-location where the device is located from the enabling device. The enabling device may be referred to as a master device, and the dependent device may be referred to as a client device or slave device. The above-described enabling device and dependent device may both correspond to general STAs (i.e., the term STA includes AP and non-AP) within the WLAN system.

In the regulation for TVWS in an FCC (Federal Communications Commission), low power Personal/Portable (P/P) Device, which can be carried by users, and high power Fixed Device, which operates at a fixed location, are defined, and the P/P device may be divided into two different types, such as Mode II device and Mode I device, in accordance with whether or not the device has identification capability, i.e., geo-location capability, respective to its current location and access capability to the GDB through an internet access. Herein, the Mode II device or Fixed Device may correspond to the enabling device (master device), and the Mode I device may corresponds to the dependent device (client/slave device).

An exemplary procedure of a dependent device, which is operating in a whitespace band, for acquiring available channel information from the enabling device will hereinafter be described. Hereinafter, for simplicity in the description, devices that can directly access the GDB will be collectively referred to as 'enabling STAs', and devices that cannot directly access the GDB will be collectively referred to as 'dependent STAs'.

Figure 5:
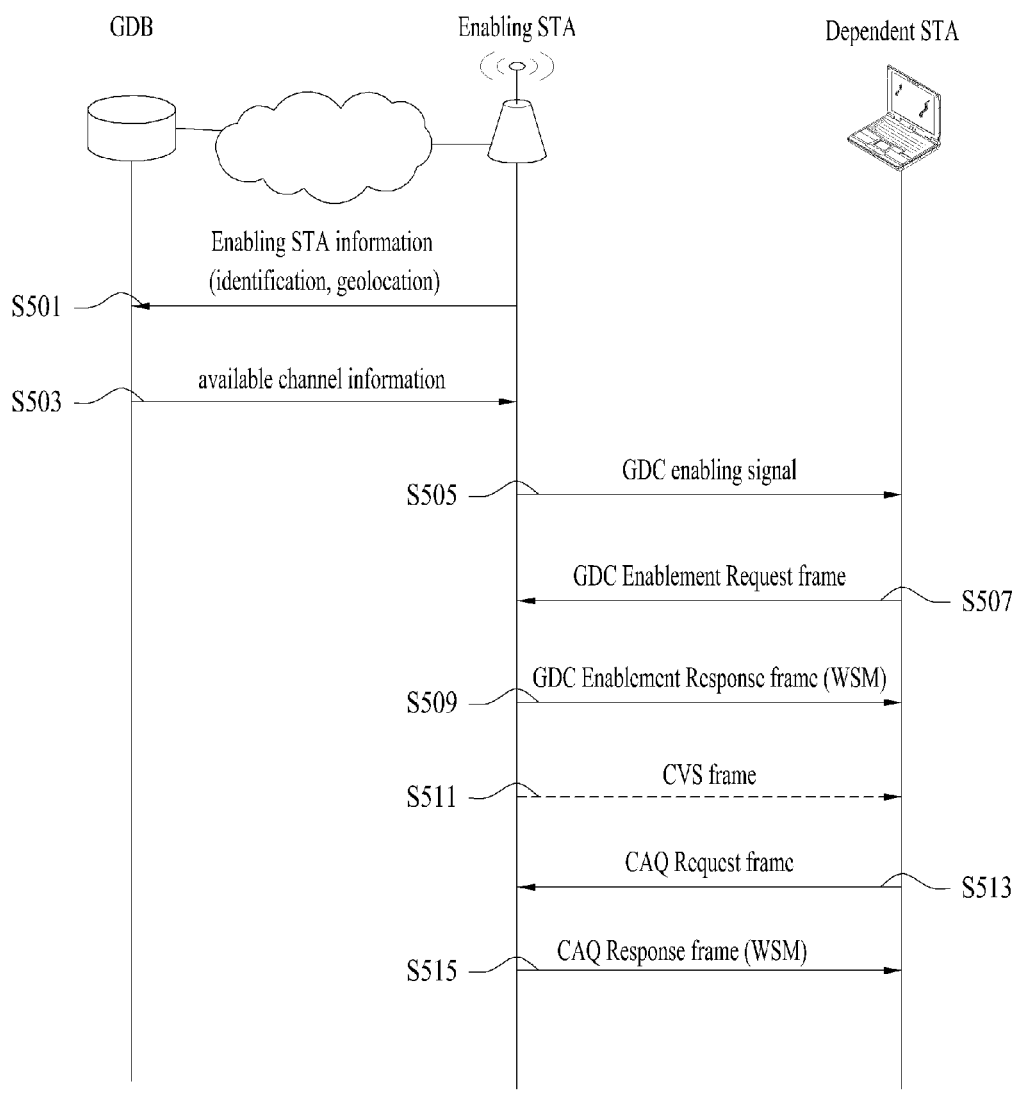
FIG. 5 illustrates exemplary operations between stations under the control of a geo-location database according to an example of the present invention.

FIG. 5 illustrates exemplary operations between stations under the control of a geo-location database according to an example of the present invention.

Referring to FIG. 5, the enabling STA may transmit its information (enabling STA information) to the GDB, in accordance with the regulations of the region where the enabling STA is located, by accessing the GDB through the Internet, and so on (S501). Herein, the enabling STA information may include its identifier, and its geolocation information, and, when required, the enabling STA may also transmit other information to the GDB.

Subsequently, the enabling STA may acquire information on an available channel list (available channel information) within the TVWS band from the GDB at its current location (S503).

After acquiring the information on an available channel list (available channel information) from the GDB, the enabling STA may configure a BSS by transmitting a GDC enabling signal (geo-location database controlled enabling signal) (S505). More specifically, the enabling STA may transmit a GDC enabling signal through a channel within an available frequency in order to notify the dependent STA that a GDC enablement service is being provided. Such GDC enabling signal may correspond to a beacon frame and may be periodically transmitted.

In a specific regulatory domain, before the enabling STA transmits a GDC Enablement Response frame to the dependent STA, a secure authentication and/or association process between the enabling STA and the dependent STA may be required. When such requirements exist, the enabling STA may access the GDB, so as to verify whether or not the corresponding dependent STA has been authenticated in order to operate in the frequency band (e.g., TVWS).

A dependent STA that wishes to participate in the BSS may perform a scanning process respective to an operating channel in the TVWS. In case the dependent STA is aware (or informed) of the available channel list from its current location (or position), the dependent STA may perform passive or active scanning only on the channels within the available channel list. Passive scanning refers to a process, wherein the dependent STA listens to a GDC enabling signal transmission from an enabling STA within the scanning channel. Active scanning refers to a process, wherein the dependent STA transmits a probe request frame within the scanning channel and receives probe frame response from the enabling STA. Conversely, in case the dependent STA is not aware of the available channel list from its current location (or position), a GDC enabling signal should be received via passive scanning. As described above, when the dependent STA receives a GDC enabling signal (or probe response frame) from the enabling STA, the corresponding dependent STA may shift to a state of being capable of transmitting a GDC Enablement Request Frame to the enable device.

Thereafter, in order to participate in (or join) the BSS, the dependent STA should be operated by receiving control of the enabling STA.

After completing the scanning process, the dependent STA may transmit a GDC Enablement Request Frame to the enabling STA in order to participate in (or join) the BSS (S507).

Subsequently, after receiving the GDC Enablement Request Frame, the enabling STA transmits a GDC Enablement Response frame to the dependent STA, which has transmitted the GDC Enablement Request Frame (S509). The GDC Enablement Response frame may include a status code indicating a grant (or validation) or rejection (or denial) of the GDC Enablement request.

The GDC Enablement Response frame may include a WSM (White Space Map). The WSM corresponds to information on a channel that can be used by an unlicensed device in the TVWS created in the form of map based upon channel and frequency information, which are acquired by the enabling STA from the GDB. The WSM may include available channel list or frequencies that can be used by the unlicensed device and information on a maximum allowed transmission power in the corresponding available channel. Herein, the channels that are included in the available channel list correspond to channels, which are not being used by signals (or users) that should be legally protected, and also correspond to channels that are available to an unlicensed device at a time point when the unlicensed device has accessed the GDB. Alternatively, when a request for an available channel respective to a time after a specific time is made from a time point, at which the unlicensed device has accessed the GDB, information on available channels and frequencies from the corresponding time point may be included. Alternatively, when the unlicensed device has made a request for an available channel to the GDB, by signaling a channel that cannot be used by the unlicensed device, information on available channels and frequencies may be delivered. Additionally, in case the operating channel bandwidth (WLAN channel) spans on multiple channels indicated in the WSM, since the maximum power level may vary for each of the multiple channels, the actual transmission power level corresponding to when the operation is actually performed may be limited to minimum transmission power levels among the multiple channels.

The WSM may include a MAP ID field, a Channel Number field, a Maximum Power Level field, and a Valid Time field, and so on. However, this is merely exemplary, and, therefore, other forms of WSM including information on available channels may also be applied to the examples of the present invention.

The MAP ID field indicates an ID of an available channel list. The Channel Number field indicates a channel number that can be used by a TVWS device. The channel number may be expresses as a TV channel number, a spectrum range, and so on, and the channel number signifies information that can specify an available channel in a frequency domain. The Maximum Power Level field indicates a maximum transmission power of the TVWS device in an available channel. The Valid Time field indicates a time period during which the available channel can be continuously (or contiguously) used. The Valid Time field may be included as an optional field instead of an essential field.

Thereafter, by receiving the WSM, the dependent STA may initiate inter-transmission/reception of data, control, management frames, and so on, to/from the enabling STA.

In addition to the GDC Enablement response frame, the enabling STA may transmit the WSM to/from the dependent STA through a CAQ Response frame (Channel Availability Query Response frame) and a WSM Announcement frame.

The enabling STA verifies that the dependent STA is positioned (or exists) within a reception range of the corresponding enabling STA and may periodically transmit a CVS frame (Contact Verification Signal frame) in order to validate the available channel list (S511). More specifically, in order to validly maintain its connection with a dependent STA, which is positioned within its service range, the enabling STA may periodically transmit the CVS frame. The dependent STA then receives the CVS frame in order to verify whether or not the corresponding dependent STA exists within the reception range of the enabling STA, which provides WSMs from the enabling STA.

The dependent STA compares a Map ID field value of an already received WSM and a Map ID field value of the CVS frame, thereby being capable of periodically verifying which channel corresponds to the currently available channel and being capable of deciding the WSM, which is not indicated by the Map ID of the CVS frame, as an invalid WSM. In case the Map ID field values are equal to one another, the dependent STA assumes that the already-existing WSM is valid and may continue to use the already-existing WSM.

Conversely, in case the Map ID field values are different from one another, the already-existing WSM has no effect, and, in order to acquire information on the a new available channel, the dependent STA transmits a CAQ Request frame (Channel Availability Query Request frame) to the enabling STA (S513).

After receiving the CAQ Request frame, in order to update the information on the available channel, the enabling STA transmits a Channel Availability Query (CAQ) Response frame to the corresponding dependent STA (S515). The CAQ Response frame may include an updated WSM. Thereafter, by receiving the updated WSM, the dependent STA may initiate inter-transmission/reception of data, control, management frames, and so on, to/from the enabling STA.

2. Channelization Method

A solution for configuring a channel (or band) (hereinafter referred to as an operating channel (or band) in order to be differentiated from TV channels) for a communication system (e.g., WLAN) operating in a TVWS is being required. A TV channel that can be used by a TVWS device (or a TV channel that is available to a TVWS device) may vary in accordance with a position (or location) of the device. Most particularly, even in a case when a contiguous TV channel cannot be used within the frequency, in order to easily support operations of the TVWS device, a solution supported by a contiguous or non-contiguous operating channel may be considered.

In the present invention, a basic unit that is supported by an operating channel may be referred to as a frequency segment. When a bandwidth of the basic unit supported by the operating channel is assumed to be equal to W MHz, bandwidths of the operating channels in the TVWS may be defined as a contiguous format of W, 2W, 4W, and 8W, and so on, and may also be defined as a non-contiguous format of W+W or 2W+2W, and so on. Such information on the operating channel width (or channel spacing) may be defined through an operation information element.

For example, in case W=2 MHz, an operating channel consisting of one frequency segment (i.e., a 2 MHz channel), an operating channel consisting of two contiguous frequency segments (i.e., a 4 MHz channel), an operating channel consisting of four contiguous frequency segments (i.e., a 8 MHz channel), an operating channel consisting of eight contiguous frequency segments (i.e., a 16 MHz channel), and so on, may be defined. Additionally, an operating channel consisting of two non-contiguous frequency segments (i.e., a 2 MHz+2 MHz channel), an operating channel consisting of two non-contiguous frequency segments, wherein each frequency section include contiguous frequency segments (i.e., a 4 MHz+4 MHz channel), and so on, may be configured. However, W=2 MHz is merely exemplary, and, the scope of the present invention includes examples of frequency segments having different bandwidths.

A primary channel refers to a common operating channel, which is shared by all STAs belonging to the BSS. More specifically, the primary channel corresponds to a basic channel of the operations of an STA. Meanwhile, a secondary channel corresponds to a channel that is associated with the primary channel and corresponds to a channel that is used to support a wider bandwidth and high throughput by being added to the primary channel. For example, when a case wherein it is assumed that a 4 MHz channel is configured of two 2 MHz channels, herein, a location of the primary channel should be decided. The location of the primary channel may indicate whether the location corresponds to a high frequency section or a low frequency section among the two 2 MHz channels.

Additionally, the setting of an operating channel (i.e., channelization) for a system operating in the TVWS may be decided based upon an available TV channel (i.e., a TV channel in which a high-priority user does not exist). For example, when the usage of contiguous TV channels is impossible (i.e., a case when the usage of TV channel n by an unlicensed device is possible, yet when the usage of TV channels n−1 and n+1 is not possible), or, when the usage of contiguous TV channel is possible, channelization for a TVWS system may be decided based upon how many contiguous TV channels are available for usage. More specifically, an operating channel may be set.

As described above, set-up information on an operating channel, which is decided based upon the available TV channels, may be provided to a dependent STA from an enabling STA. For example, the set-up information on an operating channel may include a channel starting frequency, a channel width, a channel center frequency index (a center frequency index of a frequency segment including a primary channel and a center frequency index of a frequency segment not including a primary channel), a primary channel location, and so on. Herein, the channel starting frequency may be defined by an operating class. Additionally, information in the channel width (e.g., W, 2W, 4W, W+W, 2W+2W, and so on) may be defined by the operating channel information elements, and so on. The channel center frequency index, parameters on the primary channel location, and so on, may be defined by a PLME MIB (Physical Layer Management Entity Management Information Base), and so on.

Meanwhile, in case of IEEE 802.11ac (very high throughput), frequency bandwidths of 20 MHz, 20 MHz, 80 MHz, and 160 MHz are supported.

Figure 6:
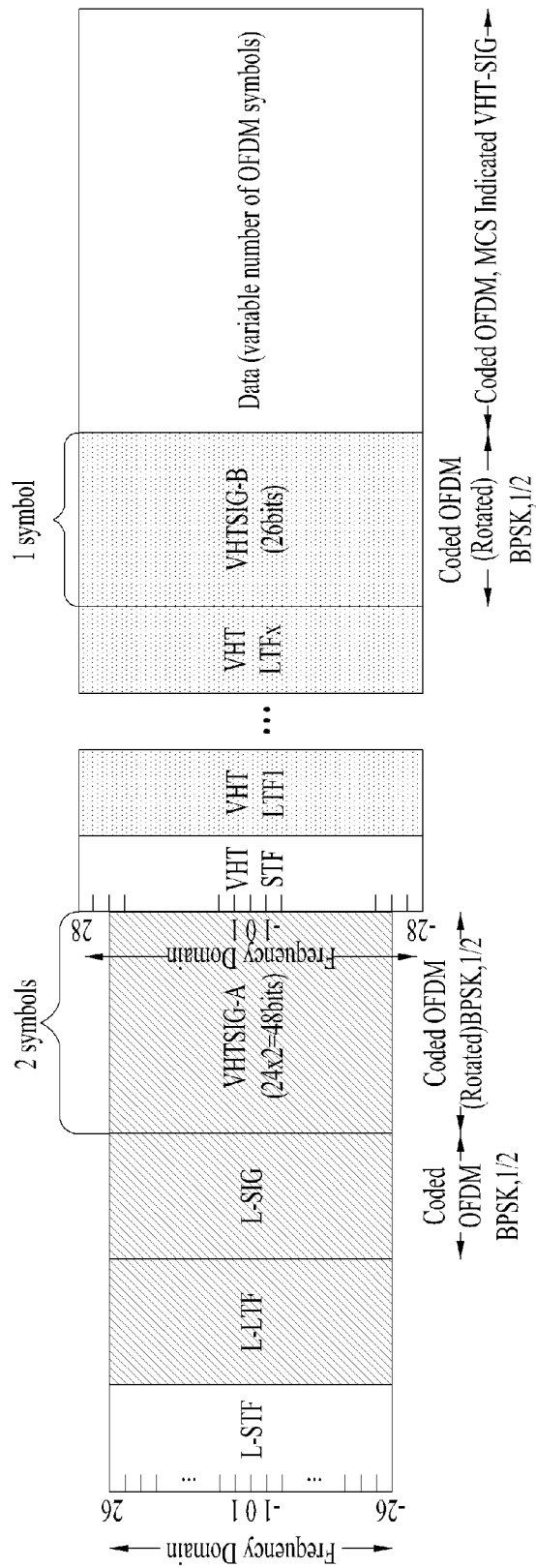
FIG. 6 to FIG. 8 illustrate exemplary frame formats when an operating channel uses a single bandwidth in an IEEE 802.11ac system.
Figure 7:
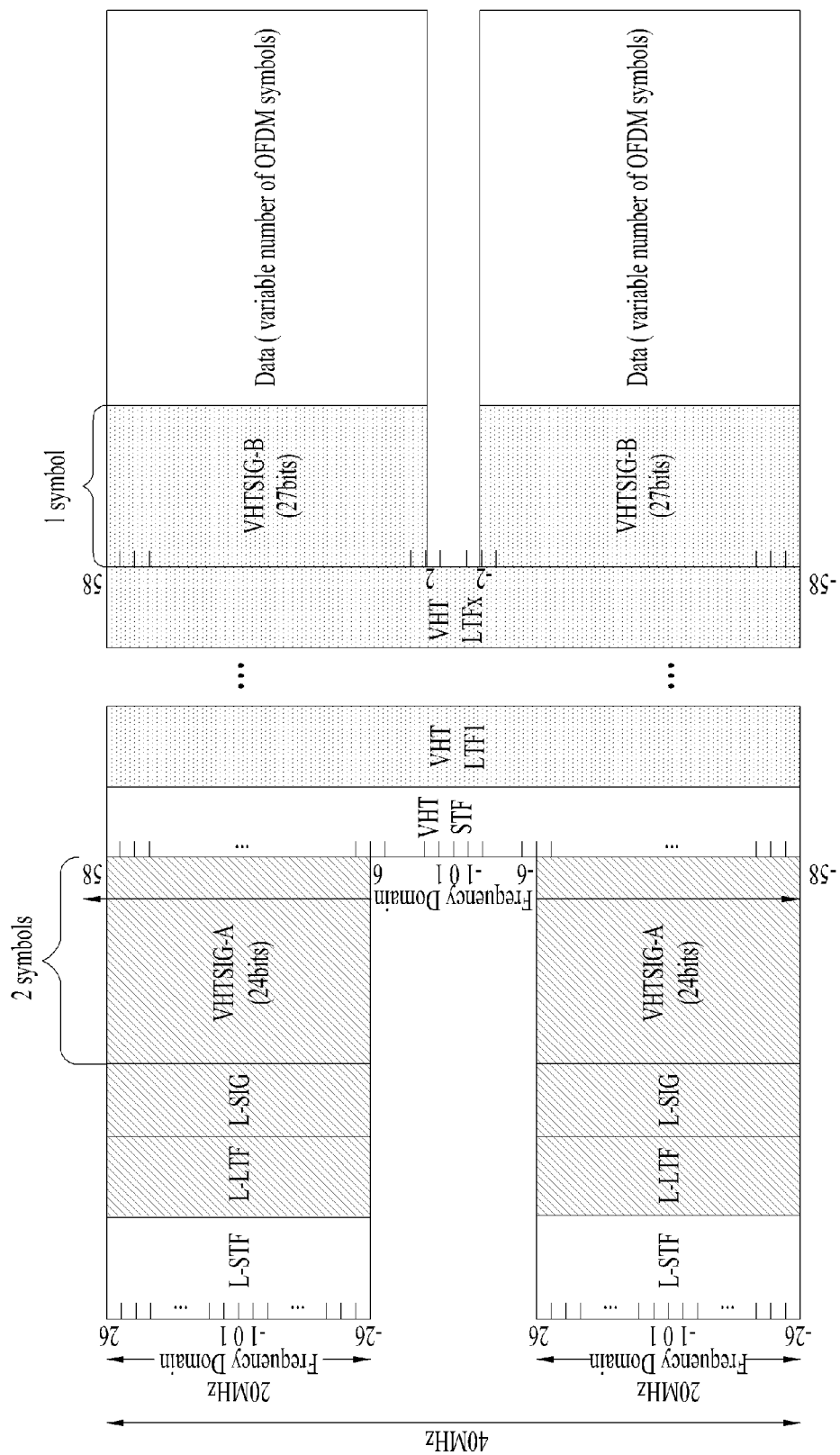
Figure 8:
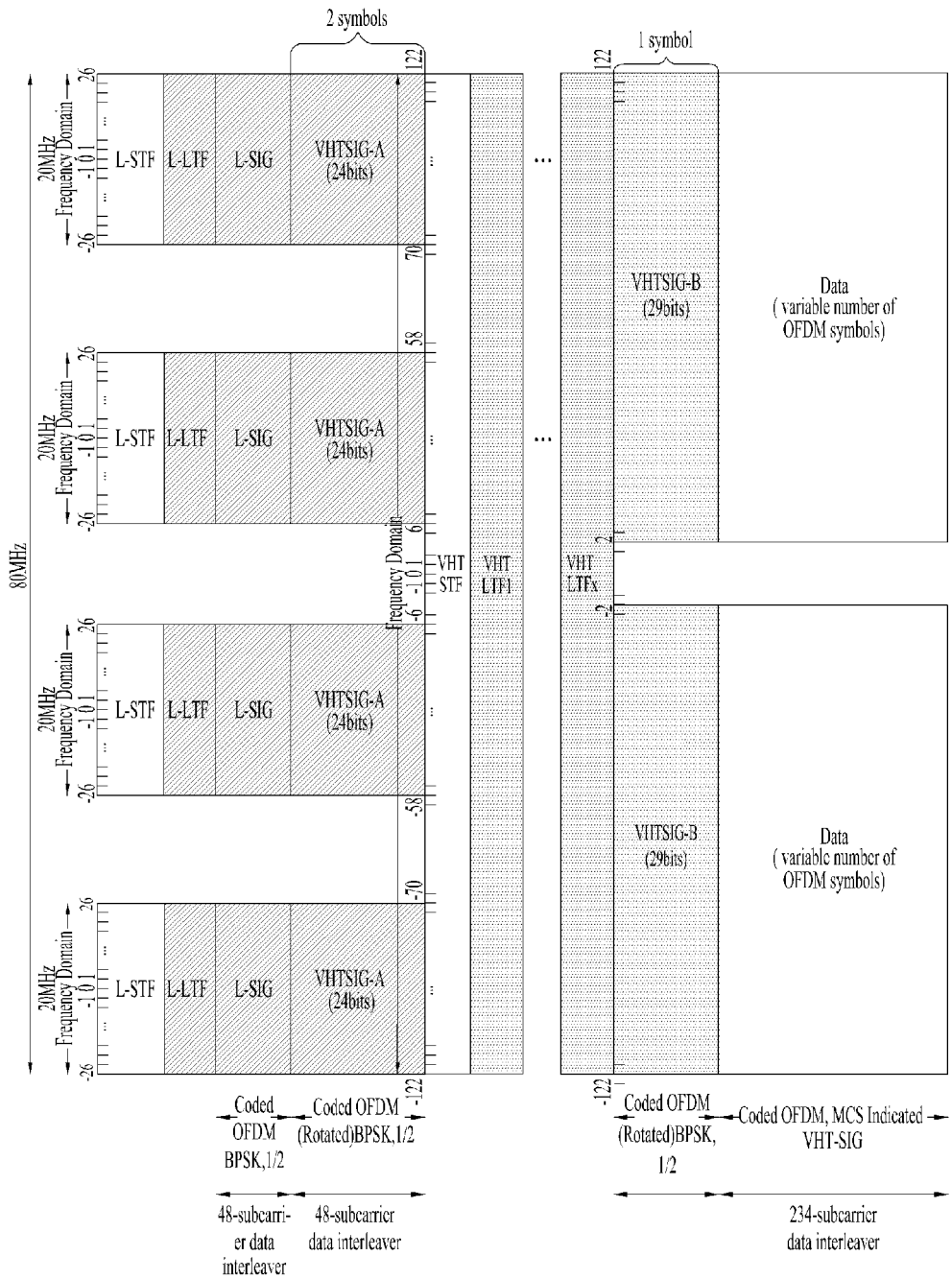

FIG. 6 to FIG. 8 illustrate exemplary frame formats when an operating channel uses a single bandwidth in an IEEE 802.11ac system.

FIG. 6 illustrates a case when a single bandwidth is equal to 20 MHz, and FIG. 7 illustrates a case when a single bandwidth is equal to 40 MHz, and FIG. 8 illustrates a case when a single bandwidth is equal to 80 MHz. And, although the frame configuration of a case when the single bandwidth is equal to 160 MHz is not shown in the drawing, the corresponding configuration may be realized by using two 80 MHz frames.

In the IEEE 802.11ac system, a frame format is configured by including a L-STF (Non-HT Short Training field) field, a L-LTF (Non-HT Long Training field) field, a L-SIG (Non-HT SIGNAL) field, a VHT-SIG-A (VHT Signal A) field, a VHT-STF (VHT Short Training field) field, a VHT-LTF (VHT Long Training field) field, VHT-SIG-B (VHT Signal B) field, and a Data field transmitting PSDU(s) (PLCP service data unit(s)). Herein, the L-STF field, the L-LTF field, and the L-SIG field collectively configure a preamble of an IEEE 802.11ac system frame, and a preamble section in each channel bandwidth has a structure consisting of a repetition of the preamble of a frame having the channel bandwidth of 20 MHz. For example, in case the channel bandwidth is equal to 40 MHz, the preamble of a frame having the channel bandwidth of 20 MHz is repeatedly used two times, and, in case the channel bandwidth is equal to 40 MHz, the preamble of a frame having the channel bandwidth of 20 MHz is repeatedly used four times.

In a frame of IEEE 802.11ac, the L-STF, L-LTF, L-SIG, VHT SIG-A fields are configured to actually use a number of subcarriers corresponding to a number of subcarriers used by the IEEE 802.11a or IEEE 802.11g system. This is to allow a legacy user of the IEEE 802.11a or IEEE 802.11g system to be capable of reading a signal (SIG) of the corresponding frame. However, since a legacy user may not exist in a TVWS bandwidth that is to be used by an IEEE 802.11af system, the number of subcarriers used in the L-STF, L-LTF, L-SIG, VHT SIG-A fields or an OFDM parameter may be set up to be identical to the VHT-LTF field or Data field. For example, referring back to FIG. 6, although an example of having the L-STF, L-LTF, L-SIG, VHT SIG-A fields configured of 52 subcarriers, the corresponding fields may also be configured of 56 subcarriers, which is identical to the VHT-LTF field or Data field. Additional, names that are different from the conventional fields may be used as the names for each field, and, for example, the name of each field may be respectively changed to O-STF (Omni-STF), O-LTF (Omni-LTF), O-SIG (Omni-SIG), WS SIG-A, and so on.

In the IEEE 802.11 af system, a method of reducing the bandwidth of a physical layer frame by down-clocking a physical layer frame of the IEEE 802.11 ac standard, which is described above in FIG. 6 to FIG. 8, is being considered. Down-clocking refers to extending the sampling cycle (or interval) to be greater than the already set sampling cycle and, as a result, reducing the frequency bandwidth as much as a down-clocking ratio. For example, by down-clocking the physical layer frame of the IEEE 802.11ac system to 5 times, the bandwidths of 20 MHz, 40 MHz, and 80 MHz, may respectively become 4 MHz, 8 MHz, and 16 MHz. Additionally, by down-clocking the physical layer frame of the IEEE 802.11ac system to 4 times or 8 times, the frequency bandwidths may become 5 MHz, 10 MHz, and 20 MHz. Furthermore, by down-clocking the physical layer frame of the IEEE 802.11ac system to 6 times, 40/6 MHz (=approximately 6.67 MHz), 80/6 MHz(=approximately 13.3 MHz), and so on, may be created.

As described above, in case of reducing the frequency bandwidth by down-clocking the physical frame of the IEEE 802.11ac system, it is preferable to consider channelization for a channel having a reduced frequency bandwidth. For example, channelization of a case of creating frequency bandwidths of 4 MHz, 8 MHz, and 16 MHz by down-clocking the frame of the IEEE 802.11ac system to 5 times, or a case of creating frequency bandwidths of 5 MHz, 10 MHz, and 20 MHz by down-clocking to 4 times or 8 times, or a case of creating frequency bandwidths of 40/6 MHz (=approximately 6.67 MHz), 80/6 MHz(=approximately 13.3 MHz), and so on, by down-clocking to 6 times, is required to be considered.

Furthermore, in case the channel width of the WS band and W MHz, which corresponds to a minimum channel bandwidth of IEEE 802.11af, are different from one another, there lies a problem in that it is difficult to support channelization of an operating channel having the channel bandwidth of 2W, 4W, 8W, and so on. For example, when it is assumed that the channel width of the WS band is equal to 6 MHz and that a minimum channel bandwidth of IEEE 802.11af is equal to 4 MHz, and in case a center frequency of an operating channel of IEEE 802.11af is matched with a center frequency of a TV channel based upon a 4 MHz channel, it is difficult to support an operating channel having a frequency bandwidth of 8 MHz, 16 MHz, and so on. Similarly, even in case the minimum channel bandwidth of IEEE 802.11af is equal to 5 MHz, it is difficult to support 10 MHz, 20 MHz, and so on, based upon a 5 MHz channel. Additionally, when it is assumed that the channel bandwidth of the WS band is equal to 8 MHz and that a minimum channel bandwidth of IEEE 802.11af is equal to 40/6 MHz (=approximately 6.67 MHz), it is difficult to support 80/6 MHz(=approximately 13.3 MHz) based upon a 40/6 MHz (=approximately 6.67 MHz) channel. This is because, when a center frequency of an operating channel having a minimum bandwidth (W) of IEEE 802.11af is matched with a center frequency of a TV channel, a problem may occur in that the center frequency of the corresponding W channel is not identical to the center frequency of the W channel being included in the operating channel (2W or 4W), which is configured of contiguous frequency segments. As described above, due to the occurrence of a problem, wherein preambles for each channel bandwidth are not identically located within the minimum bandwidth, which is supported by the operating channel, the operating channel cannot be easily verified via preamble detection, and, eventually, when channelization is performed by using the operating channel having W MHz, which corresponds to the minimum channel bandwidth of IEEE 802.11af, there lies a problem in that it is difficult to support channelization on operating channels having channel bandwidths of 2W, 4W, 8W, and so on. Accordingly, even in case the channel width of a WS band is different from W MHz, which corresponds to the minimum channel bandwidth of IEEE 802.11af, a solution for supporting channelization on operating channels having channel bandwidths of 2W, 4W, 8W, and so on, is being required.

Meanwhile, in case of the related art 802.11 system, the center frequencies for each country and the available bandwidths are pre-decided, and, accordingly, each STA configured a WLAN channel in accordance with the corresponding rule and then performed transmission.

Table 1 below shows an example of information on an operating class of a WLAN, which is defined in the United States of America.

TABLE 1

| Operating class | Global operating class | Channel starting frequency (GHz) | Channel spacing (MHz) | Channel set | Behavior limits set |
|---|---|---|---|---|---|
| 1 | 115 | 5 | 20 | 36, 40, 44, 48 | |
| 2 | 118 | 5 | 20 | 52, 56, 60, 64 | DFS_50_100_Behavior |
| ... | ... | ... | ... | ... | ... |

Referring to Table 1, it will be apparent that the center frequencies for each operating class of each WLAN channel are decided.

Additionally, in the FCC and Ofcom (Office of Communications), it is given that other STAs are to be notified as informed by data servers (i.e., a TV channel number format in the FCC and a lower frequency and upper frequency format in the Ofcom) designated by each organization. Respectively, fields shown below in Table 2 are defined in the information of the WSM of 802.11af.

Table 2 shows an example of WSM information.

TABLE 2

| Name | Length (Octet) | Value |
|---|---|---|
| Channel Number | 1 | A Channel Number field has a positive integer value (defined by an outside regulation) indicating an available TV channel for WLAN operations. The length of the Channel Number field is equal to 1 octet. When a channel number and maximum power level pair is repeated, the channel number and maximum power level pair is listed by an increasing order of TV channel numbers. |
| Maximum Power Level | 1 | A Maximum (Transmission) Power Level field indicates a maximum allowed power for performing transmission from a channel number in 0.5 dBm units. |

However, in an actual wireless LAN (e.g., 802.11af), since the bandwidth of a TV channel may not be used as decided, and since a WLAN channel may be configured through multiple TV channels, information on which channel is available for usage may be required to be additionally signaled.

In the present invention, in order to resolve the above-described problem, a solution for setting an operating channel of a WLAN system in a white space band and a signaling method for setting an operating channel are proposed.

Hereinafter, for simplicity in the description, the down-clocking ratio will be described under the assumption that the ratio corresponds to 4 times, 5 times, 6 times, and 8 times, the present invention will not be limited only to this, and, therefore, down-clocking may be performed at a different ratio. Additionally, the down-clocking ratio for creating 4 MHz, 5 MHz, and 40/6 MHz(=approximately 6.67 MHz) may diversely exist other than 4 times, 5 times, 6 times, and 8 times.

Additionally, for simplicity in the description, it will be assumed that a minimum bandwidth of an operating channel of a WLAN used in a TVWS of a specific country is equal to B MHz (e.g., B=4 MHz, 5 MHz, and 40/6 MHz(=approximately 6.67 MHz)). Moreover, it will also be assumed that a TV channel width (or TV channel spacing) in the TVWS of a specific country is equal to N MHz (e.g., N=6 MHz in case of the United States of America, and N=8 MHz in case of the United Kingdom).

Additionally, for simplicity in the description, although a TVWS is given as an example of a white space in order to describe the examples of the present invention, the scope of the present invention will not be limited only to this. More specifically, the scope of the present invention includes examples of the present invention that are applied for operations in all white spaces, which are controlled by a DB providing information on available channel in a specific location. For example, in the current time point, although the current frequency band does not correspond to a white space, the authorization (or validation) of the operations of unlicensed devices controlled by a GDB in other frequency bands, which are anticipated to correspond to a white space in later on, is expected to be realized, and examples according to the respectively applied principles of the present invention may be included in the scope of the present invention.

2.1. Embodiment 1

1) Channelization Method of a Minimum Bandwidth B HMz

In order to channelize the minimum bandwidth B HMz of a WLAN operating channel, instead of matching the center frequency of the WLAN operating channel to the center frequencies of each TV channel, the center frequency of the WLAN operating channel may be located to the spaced apart from the center frequency of the WLAN operating channel as much as a predetermined frequency. At this point, the value of the spaced frequency may be decided by the bandwidth of the TV channel and the minimum frequency bandwidth supported by the operating channel. More specifically, the center frequency of the WLAN operating channel may be shifted to a frequency being or higher than the center frequency of the TV channel by (N−B)/2 MHz, so as to be matched with the center frequency of the WLAN operating channel. For example, among the TV channels of a corresponding region, with respect to an odd-numbered (or odd number indexed) channel, the center frequency of the WLAN operating channel may be matched to a frequency higher than the center frequency of the TV channel by (N−B)/2 MHz, and, with respect to an even-numbered (or even number indexed) channel, the center frequency of the WLAN operating channel may be matched to a frequency lower than the center frequency of the TV channel by (N−B)/2 MHz. Conversely, the center frequency of the WLAN operating channel may also be matched by performing shifting along opposite directions with respect to the odd-numbered channel and the even-numbered TV channel.

Additionally, a predetermined range of TV channels may be designated, and, for each specific range, the moving (or shifting) direction of the center frequency of the odd-numbered/even-numbered TV channel may be differently set up for each specific range. For example, in case of channel numbers 21-36, among the TV channels of the corresponding region, with respect to an odd-numbered (or odd number indexed) channel, the center frequency of the WLAN operating channel may be matched to a frequency higher than the center frequency of the TV channel by (N−B)/2 MHz, and, with respect to an even-numbered (or even number indexed) channel, the center frequency of the WLAN operating channel may be matched to a frequency lower than the center frequency of the TV channel by (N−B)/2 MHz, and, conversely, in case of channel numbers 37-51, with respect to an even-numbered channel, the center frequency of the WLAN operating channel may be matched to a frequency higher than the center frequency of the TV channel by (N−B)/2 MHz, and, with respect to an odd-numbered channel, the center frequency of the WLAN operating channel may be matched to a frequency lower than the center frequency of the TV channel by (N−B)/2 MHz.

Hereinafter, a case when the TV channel bandwidth (N) is equal to 6 MHz, and when a minimum bandwidth of the operating channel is equal to 4 MHz (B), will be given as an example and described accordingly.

Figure 9:
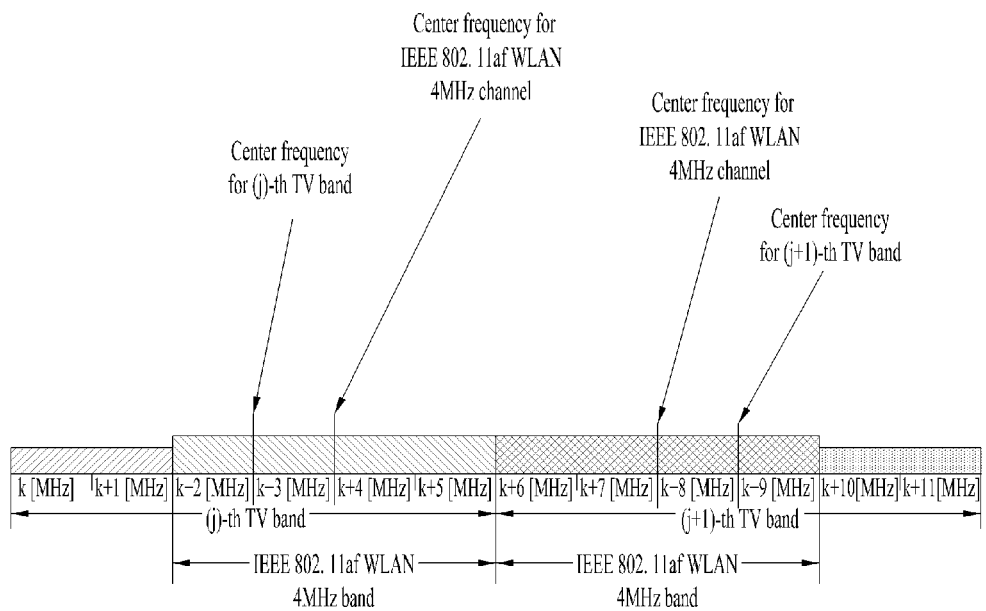
FIG. 9 illustrates an exemplary channelization according to the present invention with respect to a case when one TV channel is used.

FIG. 9 illustrates an exemplary channelization according to the present invention with respect to a case when one TV channel is used.

FIG. 9 illustrates an exemplary case when the bandwidth of the WLAN operating channel is equal to 4 MHz, and, for example, the 4 MHz operating channel may be created by performing down-clocking to 5 times on a 20 MHz channel of IEEE 802.11ac.

Referring to FIG. 9, by applying the above-described method, instead of matching the center frequency of an operating channel of IEEE 802.11af to the center frequency of a TV channel, an exemplary case of matching the center frequency of an operating channel by shifting the center frequency of the operating channel to a frequency being lower or higher by 1 MHz(=(6−4)/2 MHz) is presented herein. More specifically, FIG. 9 illustrates a case when, in a $j^{th}$ TV channel, the center frequency of the WLAN operating channel is matched to a frequency higher than the center frequency of the TV channel by 1 MHz, and, in a $j+1^{th}$ TV channel, the center frequency of the WLAN operating channel is matched to a frequency lower than the center frequency of the TV channel by 1 MHz.

As described above, by applying a method of matching the center frequency of the 802.11af operating channel to a frequency higher than the center frequency of the TV channel by 1 MHz with respect to an odd-numbered channel, and matching the center frequency of the 802.11af operating channel to a frequency lower than the center frequency of the TV channel by 1 MHz with respect to an even-numbered channel, the $j^{th}$ TV channel may correspond to the odd-numbered channel, and, conversely, the $j+1^{th}$ TV channel may correspond to the even-numbered channel. On the other hand, when the center frequency of the WLAN operating channel is matched by performing shifting along opposite directions with respect to the odd-numbered channel and the even-numbered TV channel, the $j^{th}$ TV channel may correspond to the even-numbered channel, and the $j+1^{th}$ TV channel may correspond to the odd-numbered channel.

Furthermore, as described above, in case the shifting directions of the odd-numbered/even-numbered TV channels are differently set up for each specific range of TV channels, when the $j^{th}$ TV channel belongs to TV channel numbers 21-36, the $j^{th}$ TV channel may correspond to an odd-numbered channel, and, when the $j+1^{th}$ TV channel belongs to TV channel numbers 37-51, the $j+1^{th}$ TV channel may correspond to an even-numbered channel.

2) Channelization Method of Contiguous 2*B MHz

In case the operating channels are defined to be contiguous and to have bandwidths of 2*B MHz, the center frequency of the contiguous 2*B MHz operating channel may be matched to an edge (or boundary) of each TV channel.

Additionally, a center frequency of an operating channel of a 2*B MHz WLAN system may not exist in the edge of all TV channels. For example, as described above in the minimum bandwidth B MHz channelization method, in case the center frequency of the WLAN operating channel is matched to a frequency higher than the center frequency of the TV channel by (N−B)/2 MHz with respect to an odd-numbered channel, and in case the center frequency of the WLAN operating channel is matched to a frequency lower than the center frequency of the TV channel by (N−B)/2 MHz with respect to an even-numbered channel, the center frequency of the 2*B MHz operating channel may be respectively matched to the edges of odd-numbered TV channels and even-numbered TV channels. Conversely, in case the center frequency of the WLAN operating channel is matched by performing shifting along opposite directions with respect to the odd-numbered channel and the even-numbered TV channel, the center frequency of the 2*B MHz operating channel may also be matched to edges of even-numbered TV channels and odd-numbered TV channels.

Hereinafter, a case when the TV channel bandwidth (N) is equal to 6 MHz, and when a minimum bandwidth of the operating channel is equal to 4 MHz (B), will be given as an example and described accordingly.

Figure 10:
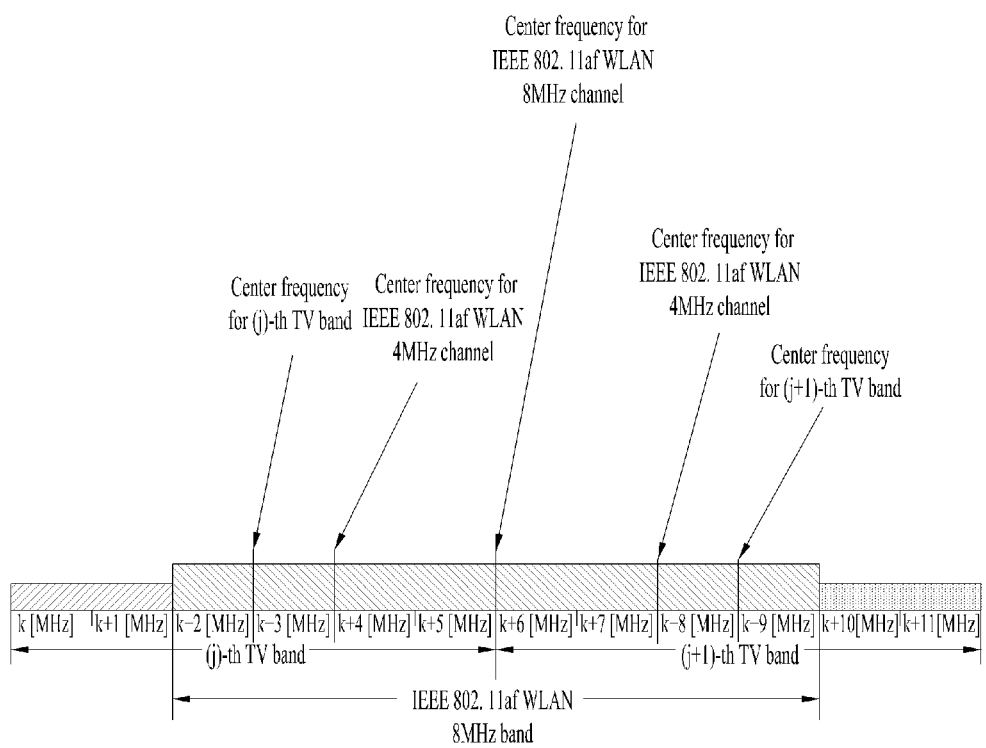
FIG. 10 illustrates an exemplary channelization according to the present invention with respect to a case when two consecutive TV channels are used.

FIG. 10 illustrates an exemplary channelization according to the present invention with respect to a case when two consecutive TV channels are used.

FIG. 10 illustrates an exemplary case when the bandwidth of the WLAN operating channel is equal to contiguous 8 MHz, and, for example, the contiguous 8 MHz operating channel may be created by performing down-clocking to 5 times on a 40 MHz channel of IEEE 802.11ac.

Referring to FIG. 10, by applying the above-described method, instead of matching the center frequency of an operating channel of IEEE 802.11af to the center frequency of a TV channel, an exemplary case of matching the center frequency of an operating channel of IEEE 802.11af to the edge of each TV channel is presented herein. In other words, FIG. 10 illustrates a case when the center frequency of the operating channel of IEEE 802.11af is matched to the edges of the $j^{th}$ TV channel and the $j+1^{th}$ TV channel.

Most particularly, as described above, by applying a method of matching the center frequency of the 802.11af operating channel to a frequency higher than the center frequency of the TV channel by 1 MHz (=(6−4)/2 MHz) with respect to an odd-numbered channel, and matching the center frequency of the 802.11af operating channel to a frequency lower than the center frequency of the TV channel by 1 MHz with respect to an even-numbered channel, the center frequency of the 8 MHz operating channel is matched to edges of the odd-numbered TV channel and the even-numbered TV channel. More specifically, in FIG. 10, the $j^{th}$ TV channel may correspond to the odd-numbered channel, and the $j+1^{th}$ TV channel may correspond to the even-numbered channel. On the other hand, when the center frequency of the WLAN operating channel is matched by performing shifting along opposite directions with respect to the odd-numbered channel and the even-numbered TV channel, the $j^{th}$ TV channel may correspond to the even-numbered channel, and the $j+1^{th}$ TV channel may correspond to the odd-numbered channel.

3) Channelization Method of Non-Contiguous 2*B MHz

In case the operating channels are defined to be non-contiguous and to have bandwidths of 2*B MHz, the non-contiguous 2*B MHz operating channel may be created by using two B MHz channels proposed above in 1). Herein, when the IEEE 802.11ac system supports a 160 MHz bandwidth, a method identical or similar to the method of creating an operating channel by using two 80 MHz bandwidths may be used.

In order to channelize the 2*B MHz operating channel, each center frequency may be matched by applying the channelization method on the above-described B MHz operating channel to each WLAN B MHz channel configuring the 2*B MHz operating channel.

Hereinafter, a case when the TV channel bandwidth (N) is equal to 6 MHz, and when a minimum bandwidth of the operating channel is equal to 4 MHz (B), will be given as an example and described accordingly.

Figure 11:
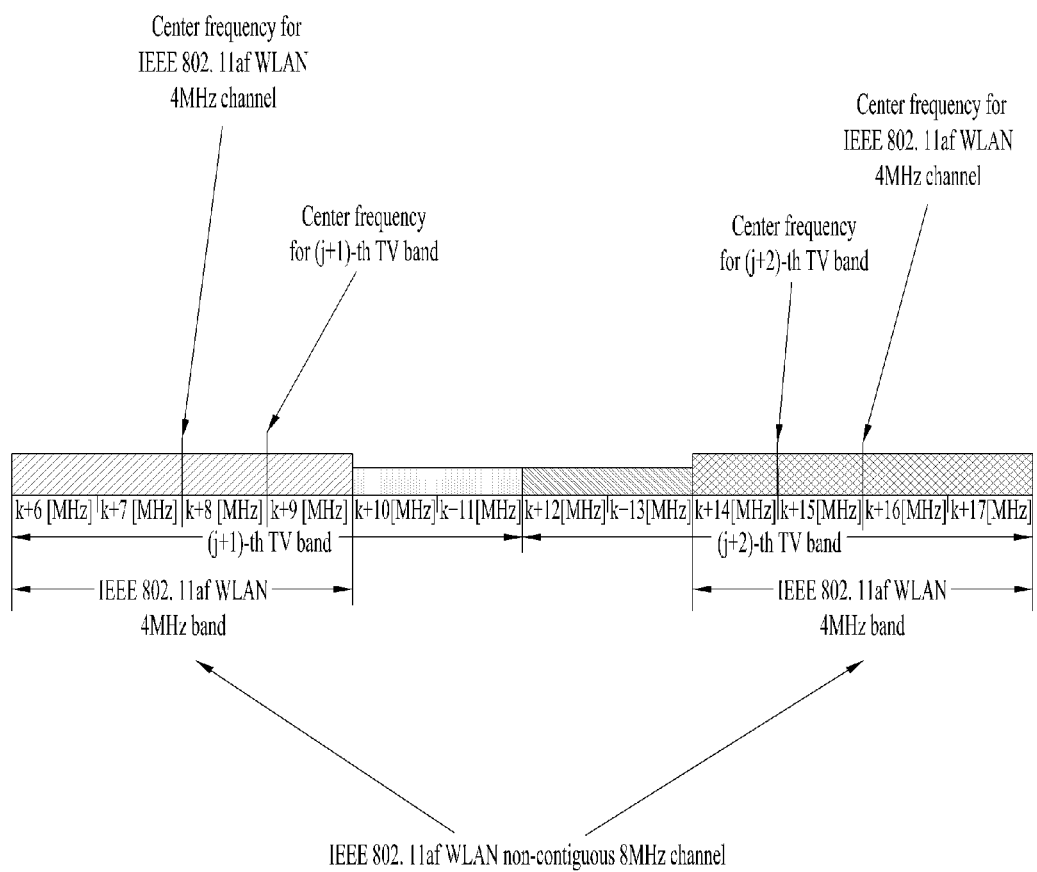
FIG. 11 illustrates an exemplary channelization according to the present invention with respect to a case when two consecutive TV channels are used.

FIG. 11 illustrates an exemplary channelization according to the present invention with respect to a case when two consecutive TV channels are used.

FIG. 11 illustrates an exemplary case when the bandwidth of the WLAN operating channel is equal to non-contiguous 8 MHz, and, for example, the non-contiguous 8 MHz operating channel may be created by using two 4 MHz channels of IEEE 802.11af.

Referring to FIG. 11, by applying the channelization method respective to each 4 MHz operating channel, instead of matching the center frequency of an operating channel of IEEE 802.11af to the center frequency of a TV channel, an exemplary case of matching the center frequency of an operating channel by shifting to a lower frequency or higher frequency by 1 MHz(=(6−4)/2 MHz). More specifically, presented herein is an example of a case when, in the j+1$^{th}$ TV channel, a center frequency of the WLAN operating channel (4 MHz) is matched to a frequency that is lower than the center frequency of the TV channel by 1 MHz, and when, in j$^{th}$ TV channel, a center frequency of the WLAN operating channel (4 MHz) is matched to a frequency that is higher than the center frequency of the TV channel by 1 MHz.

Herein, in case of the TV channel to which each operating channel belongs, 2 TV channels may be contiguous or may be non-contiguous. FIG. 11 shows a case when two TV channels are contiguous.

4) Channelization Method of Contiguous 4*B MHz

In case the operating channels are defined to be contiguous and to have bandwidths of 4*B MHz, the center frequencies of the contiguous 4*B MHz operating channels may be matched to edge portions of each TV channel.

Additionally, a center frequency of an operating channel of a 4*B MHz WLAN system may not exist in the edge portions of all TV channels. For example, as described above in the minimum bandwidth B MHz channelization method, in case the center frequency of the WLAN operating channel is matched to a frequency higher than the center frequency of the TV channel by (N−B)/2 MHz with respect to an odd-numbered channel, and in case the center frequency of the WLAN operating channel is matched to a frequency lower than the center frequency of the TV channel by (N−B)/2 MHz with respect to an even-numbered channel, the center frequency of the 4*B MHz operating channel may be respectively matched to edge portions (edge portions of a 2$^{nd}$ TV channel and a 3$^{rd}$ TV channel among four contiguous TV channels) of each second odd-numbered TV channel and an even-numbered TV channel. Conversely, in case the center frequency of the WLAN operating channel is matched by performing shifting along opposite directions with respect to the odd-numbered channel and the even-numbered TV channel, the center frequency of the 2*B MHz operating channel may also be matched to edge portions (edge portions of a 2$^{nd}$ TV channel and a 3$^{rd}$ TV channel among four contiguous TV channels) of each second even-numbered TV channel and an odd-numbered TV channel. More specifically, even though the center frequency of the 2*B MHz operating channel is matched, by configuring the B MHz channel, which is located at a front side portion of the 2*B MHz operating channel, to be contiguous, an overall 4*B MHz operating channel may be configured. As a result, among the edge portions of the TV channel in which the center frequency of the 2*B MHz operating channel can be located, the center frequency of the 4*B MHz operating channel can be located at only one edge portion of each TV channel pair (or each set of 2 TV channels).

Hereinafter, a case when the TV channel bandwidth (N) is equal to 6 MHz, and when a minimum bandwidth of the operating channel is equal to 4 MHz (B), will be given as an example and described accordingly.

Figure 12:
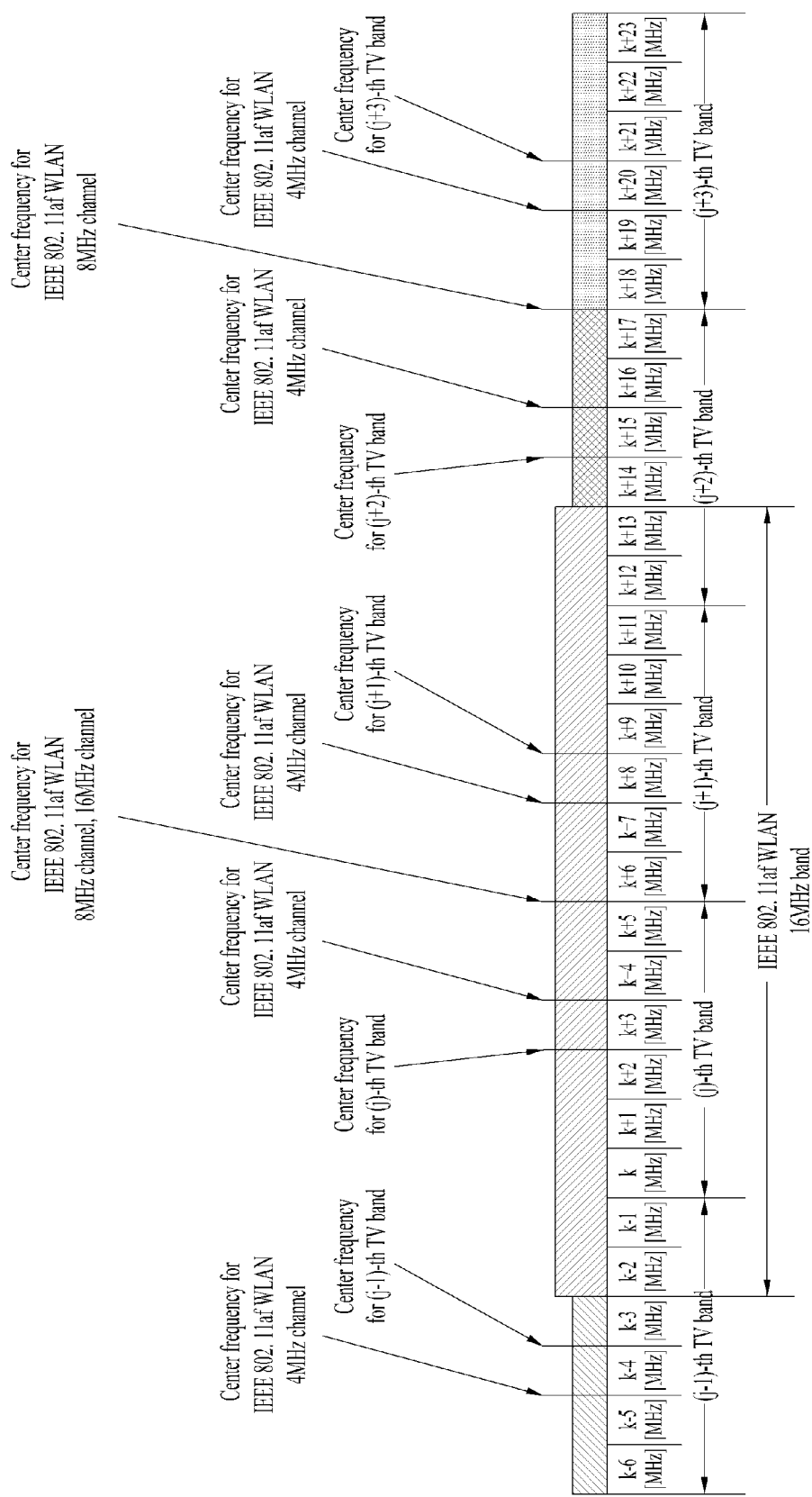
FIG. 12 illustrates an exemplary channelization according to the present invention with respect to a case when four consecutive TV channels are used.

FIG. 12 illustrates an exemplary channelization according to the present invention with respect to a case when four consecutive TV channels are used.

FIG. 12 illustrates an exemplary case when the bandwidth of the WLAN operating channel is equal to contiguous 16 MHz(4*B), and, for example, the contiguous 16 MHz operating channel may be created by performing down-clocking to 5 times on a 80 MHz channel of IEEE 802.11ac.

Referring to FIG. 12, by applying the above-described method, instead of matching the center frequency of an operating channel of IEEE 802.11af to the center frequency of a TV channel, an exemplary case of matching the center frequency of an operating channel of IEEE 802.11af to edge portions of each TV channel is presented herein. In other words, FIG. 12 illustrates a case when the center frequency of the operating channel of IEEE 802.11af is matched to edge portions of the j$^{th}$ TV channel and the j+1$^{th}$ TV channel.

Most particularly, as described above, according to the above-described minimum bandwidth 4 MHz(B) channelization method, by applying a method of matching the center frequency of the 802.11af operating channel to a frequency higher than the center frequency of the TV channel by 1 MHz (=(6−4)/2 MHz) with respect to an odd-numbered channel, and matching the center frequency of the 802.11af operating channel to a frequency lower than the center frequency of the TV channel by 1 MHz with respect to an even-numbered channel, the center frequency of the 8 MHz operating channel is matched to edge portions of each second odd-numbered TV channel and even-numbered TV channel. More specifically, in FIG. 12, the j+1$^{th}$ TV channel may correspond to the second odd-numbered channel, and the j$^{th}$ TV channel may correspond to the even-numbered channel. On the other hand, when the center frequency of the WLAN operating channel is matched by performing shifting along opposite directions with respect to the odd-numbered channel and the even-numbered TV channel, the j+1$^{th}$ TV channel may correspond to the second even-numbered channel, and the j$^{th}$ TV channel may correspond to the odd-numbered channel.

5) Channelization Method of Non-Contiguous 4*B MHz

In case the operating channels are defined to be non-contiguous and to have bandwidths of 4*B MHz, the non-contiguous 4*B MHz operating channel may be created by using four B MHz channels proposed above in 1). Alternatively, the non-contiguous 4*B MHz operating channel may be created by using two 2*B MHz channels proposed above in 2). Alternatively, the non-contiguous 4*B MHz operating channel may be created by using two B MHz channels proposed above in 1) and one 2*B MHz channel proposed above in 2).

In order to channelize the 4*B MHz operating channel, each center frequency may be matched by applying the above-described channelization method on the B MHz operating channel/channelization method on the contiguous 2*B MHz operating channel to each B MHz/2*B MHz channel configuring the 4*B MHz operating channel.

As described above, even if channelization is performed on a 2*B or 4*B MHz operating channel by using a B MHz operating channel, wherein B MHz corresponds to a minimum bandwidth according to this exemplary embodiment, since positions of the B MHz operating channel and the preamble can also be identically aligned in the 2*B or 4*B MHz operating channel, the operating channel may be easily verified through preamble prediction.

Additionally, since a contiguous 2*B or 4*B MHz operating channel may be set up due to the B MHz operating channel being located at a neighboring (or adjacent) position, an IFFT (IDFT) having the same size as that of the conventional IEEE 802.11ac system may be used.

2.2. Embodiment 2

In case of an operating channel of a WLAN system having a minimum bandwidth that is supported by a TVWS of each country, the corresponding operating channel is positioned at a center of the TV channel, and, in case of an operating channel of a WLAN system having a bandwidth larger than the minimum bandwidth, an available center frequency is positioned at an edge (or edge portion) of the minimum bandwidth. More specifically, in case of the operating channel having the minimum bandwidth, the center frequency of the corresponding operating channel is matched to the center frequency of a TV channel, yet, in case of the operating channel that does not have the minimum bandwidth, the center frequency of the corresponding operating channel is matched to the edge of the minimum bandwidth.

For example, in case of the United States of America, since the bandwidth of each TV channel is equal to 6 MHz, when it is assumed that the minimum bandwidth of the supported WLAN operating channel is equal to 4 MHz or 5 MHz, and, in case of the United Kingdom, since the bandwidth of each TV channel is equal to 8 MHz, when it is assumed that the minimum bandwidth of the supported WLAN operating channel is equal to 40/6 MHz(=approximately 6.67 MHz), a center frequency of the operating channel having the bandwidth of 4 MHz or 5 MHz, in case of the United States of America, and a center frequency of the operating channel having the bandwidth of 40/6 MHz (=approximately 6.67 MHz), in case of the United Kingdom, is matched to a center frequency of a TV channel to which the corresponding operating channel belongs. Conversely, in case of an operating channel having a bandwidth of 8 MHz, 16 MHz, and so on, when the minimum bandwidth is equal to 4 MHz, or in case of an operating channel having a bandwidth of 10 MHz, 20 MHz, and so on, when the minimum bandwidth is equal to 5 MHz, or in case of an operating channel having a bandwidth of 80/6 MHz(=approximately 13.3 MHz), and so on, when the minimum bandwidth is equal to 40/6 MHz(=approximately 6.67 MHz), the available center frequency is positioned at the edge of the minimum bandwidth. Even if the minimum bandwidth of the WLAN operating channel has a bandwidth that is different from the above-described bandwidths, it will be evident that the same principles may be identically applied.

1) Channelization Method of a Minimum Bandwidth B MHz

In case of an operating channel having a bandwidth that is equal to the minimum bandwidth B MHz, a center frequency of the corresponding operating channel is matched to a center frequency of a TV channel to which the corresponding operating channel belongs.

Hereinafter, a case when the TV channel bandwidth (N) is equal to 6 MHz, and when a minimum bandwidth of the operating channel is equal to 5 MHz (B), will be given as an example and described accordingly.

Figure 13:
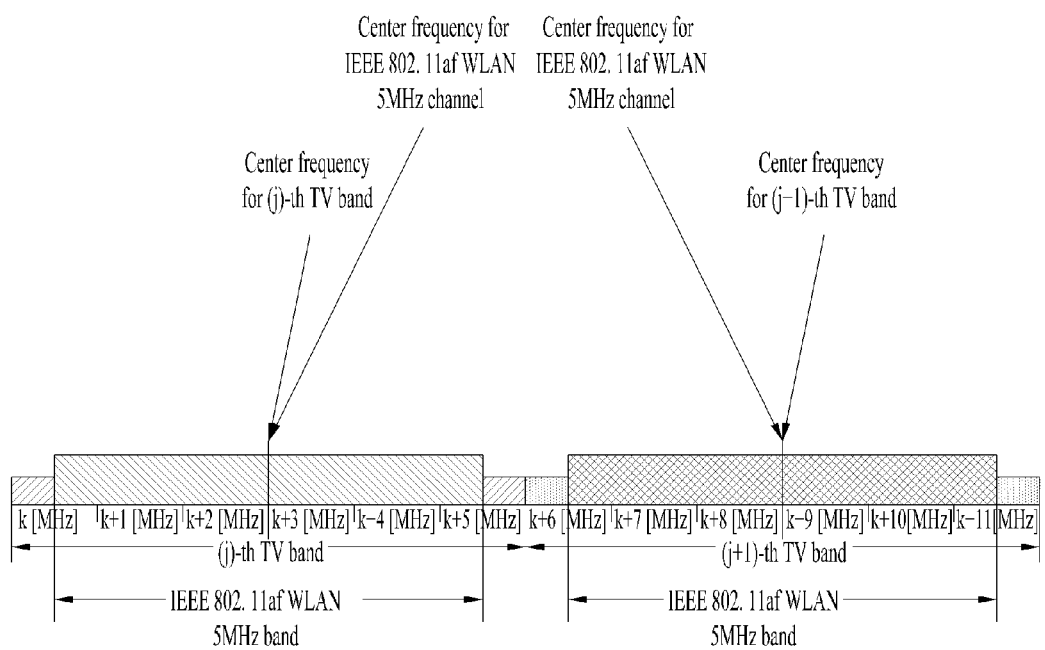
FIG. 13 illustrates an exemplary channelization according to the present invention with respect to a case when one TV channel is used.

FIG. 13 illustrates an exemplary channelization according to the present invention with respect to a case when one TV channel is used.

FIG. 13 illustrates an exemplary case when the bandwidth of the WLAN operating channel is equal to 5 MHz, and, for example, the 5 MHz operating channel may be created by down-clocking a 20 MHz channel of IEEE 802.11ac to 4 times or by down-clocking a 40 MHz channel of IEEE 802.11ac to 8 times.

Referring to FIG. 13, an example of matching a center frequency of an operating channel of IEEE 802.11af to a center frequency of a TV channel by applying the above-described method is presented. More specifically, More specifically, FIG. 13 illustrates a case when a center frequency of the WLAN operating channel is matched to a $j^{th}$ TV channel and a $j+1^{th}$ TV channel.

2) Channelization Method of Contiguous 2*B MHz

In case the operating channels are defined to be contiguous and to have bandwidths of 2*B MHz, the center frequency of the contiguous 2*B MHz operating channel is positioned at the edge of the minimum bandwidth B MHz, which configures the corresponding operating channel. More specifically, in a state when the center frequency of each minimum bandwidth B MHz channel is matched to the center frequency of the TV channel to which the corresponding channel belongs, while any one of the two minimum bandwidth B MHz channels is fixed, the center frequency of a contiguous 2*B MHz operating channel is positioned at the edge of the fixed channel.

Hereinafter, a case when the TV channel bandwidth (N) is equal to 6 MHz, and when a minimum bandwidth of the operating channel is equal to 5 MHz (B), will be given as an example and described accordingly.

Figure 14:
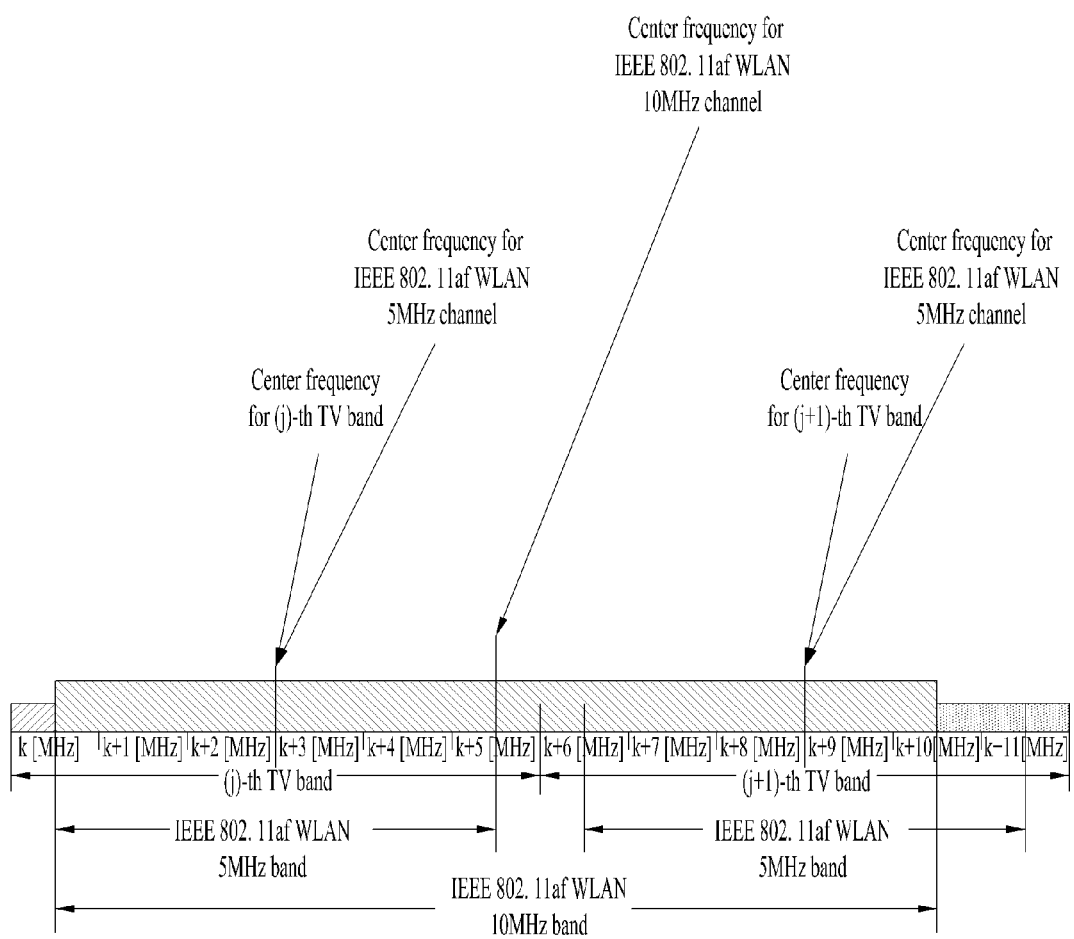
FIG. 14 and FIG. 15 respectively illustrate an exemplary channelization according to the present invention with respect to a case when two consecutive TV channels are used.
Figure 15:
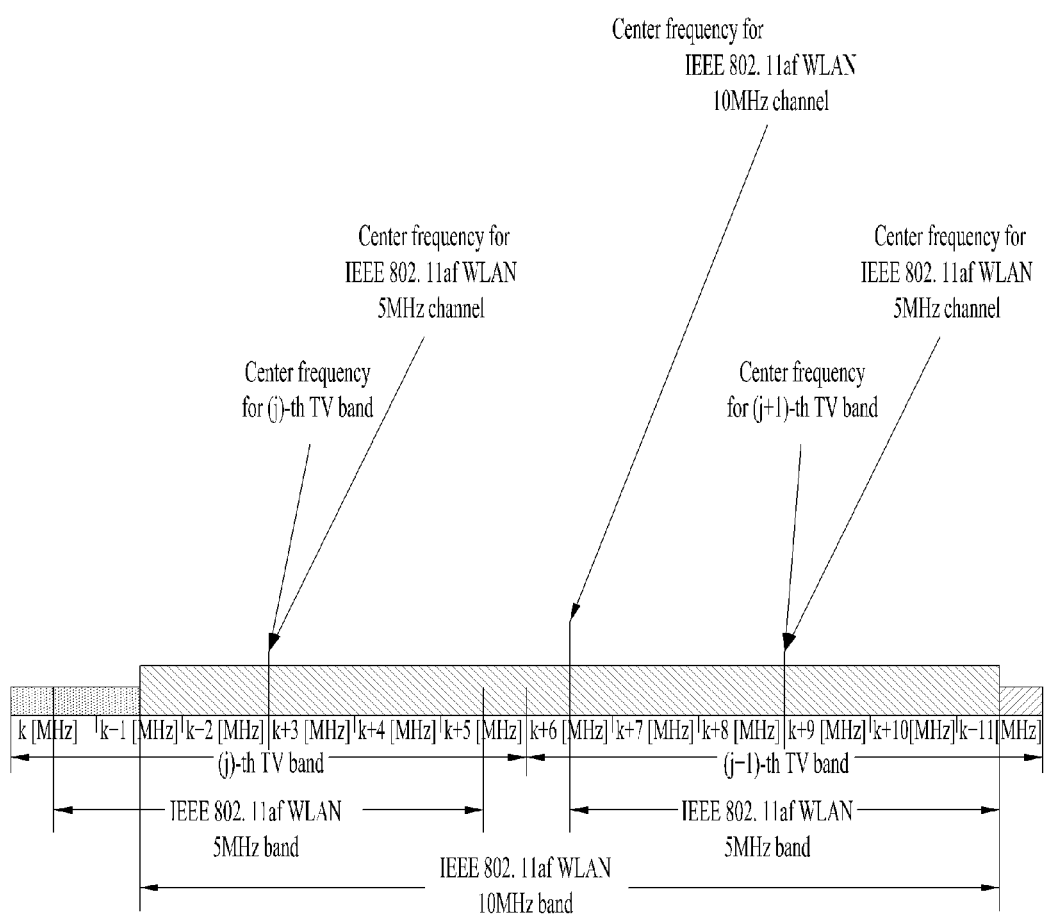

FIG. 14 and FIG. 15 respectively illustrate an exemplary channelization according to the present invention with respect to a case when two consecutive TV channels are used.

FIGS. 14 and 15 illustrate exemplary cases when the bandwidth of the WLAN operating channel is equal to contiguous 10 MHz, and, for example, the contiguous 10 MHz operating channel may be created by down-clocking a 40 MHz channel of IEEE 802.11ac to 4 times or by down-clocking a 80 MHz channel of IEEE 802.11ac to 8 times.

Referring to FIGS. 14 and 15, presented herein is an example of a case when by applying the above-described method, instead of matching the center frequency of an operating channel of IEEE 802.11af to the center frequency of a TV channel or the edge of a contiguous TV channel, an exemplary case of matching the center frequency of an operating channel of IEEE 802.11af to the edge of a minimum bandwidth 5 MHz, which configures the operating channel of the IEEE 802.11af.

FIG. 14 illustrates a case when a center frequency of a minimum bandwidth 5 MHz channel, which is located on the left side is matched to a center frequency of a $j^{th}$ TV channel to which the corresponding channel belongs, and when a center frequency of an operating channel of IEEE 802.11af having a bandwidth of 10 MHz is matched to a right-side edge of the corresponding minimum bandwidth 5 MHz channel. More specifically, this is the same as shifting a minimum bandwidth 5 MHz channel that is located on the right side, while the minimum bandwidth 5 MHz channel that is located on the left side is in a fixed state. Conversely, FIG. 15 illustrates a case when a center frequency of a minimum bandwidth 5 MHz channel, which is located on the right side is matched to a center frequency of a $j+1^{th}$ TV channel to which the corresponding channel belongs, and when a center frequency of an operating channel of IEEE 802.11af having a bandwidth of 10 MHz is matched to a left-side edge of the corresponding minimum bandwidth 5 MHz channel. More specifically, this is the same as shifting a minimum bandwidth 5 MHz channel that is located on the left side, while the minimum bandwidth 5 MHz channel that is located on the right side is in a fixed state.

3) Channelization Method of Non-Contiguous 2*B MHz

In case the operating channels are defined to be non-contiguous and to have bandwidths of 2*B MHz, the non-contiguous 2*B MHz operating channel may be created by using two B MHz channels proposed above in 1). Herein, when the IEEE 802.11ac system supports a 160 MHz bandwidth, a method identical or similar to the method of creating an operating channel by using two 80 MHz bandwidths may be used.

In order to channelize the 2*B MHz operating channel, each center frequency may be matched by applying the channelization method on the above-described B MHz operating channel to each WLAN B MHz channel configuring the 2*B MHz operating channel.

4) Channelization Method of Contiguous 4*B MHz

In case the operating channels are defined to be contiguous and to have bandwidths of 4*B MHz, the center frequency of the contiguous 4*B MHz operating channel is positioned at the edge of the 2*B MHz channel, which configures the corresponding operating channel. More specifically, in a state of positioning the center frequency of each 2*B MHz channel at the edge of any one of two minimum bandwidth B MHz channels, by using the method proposed above in 2), the center frequency of a contiguous 4*B MHz channel is positioned at the edge of one of the two 2*B MHz channels.

5) Channelization Method of Non-Contiguous 4*B MHz

In case the operating channels are defined to be non-contiguous and to have bandwidths of 4*B MHz, the non-contiguous 4*B MHz operating channel may be created by using four B MHz channels proposed above in 1). Alternatively, the non-contiguous 4*B MHz operating channel may be created by using two 2*B MHz channels proposed above in 2). Alternatively, the non-contiguous 4*B MHz operating channel may be created by using two B MHz channels proposed above in 1) and one 2*B MHz channel proposed above in 2).

In order to channelize the 4*B MHz operating channel, each center frequency may be matched by applying the above-described channelization method on the B MHz operating channel/channelization method on the contiguous 2*B MHz operating channel to each B MHz/2*B MHz channel configuring the 4*B MHz operating channel.

As described above, even if channelization is performed on a 2*B or 4*B MHz operating channel by using a B MHz operating channel, wherein B MHz corresponds to a minimum bandwidth according to this exemplary embodiment, if a B MHz channel having its position unchanged is set as a primary channel, since positions of the B MHz operating channel and the preamble can also be identically aligned in the 2*B or 4*B MHz operating channel, the operating channel may be easily verified through preamble prediction.

Additionally, since a contiguous 2*B or 4*B MHz operating channel may be set up due to the B MHz operating channel being located at a neighboring position, an IFFT (IDFT) having the same size as that of the conventional IEEE 802.11ac system may be used.

2.3. Embodiment 3

As described above, in order to allow an STA to operate in a TVWS, since a protection (or guard) scheme respective to an incumbent device (or licensed device) is required to be provided firsthand, depending upon whether an incumbent device, such as a TV, is being used at a left side (lower frequency) or a right side (higher frequency) of a TV channel being used by the WLAN, the channelization may be performed differently. More specifically, among TV channels neighboring (or being adjacent to) a TV channel, which is set as the operating channel, depending upon the TV channel that is used by the incumbent device, the center frequency of the operating channel may be set differently. In case of a non-contiguous 2*B MHz or 4*B MHz operating channel, the methods described above in 2.1. or 2.2. may be followed by this exemplary embodiment.

When the incumbent device uses a TV channel that is neighboring (or adjacent to) the TV channel that is used by the WLAN, different cases may be defined as described below depending upon a position (or location) of the TV channel that is used by the incumbent device.

Case 1 corresponds to a case when the incumbent device is using a TV channel that is adjacent to the left side (lower frequency) of the TV channel that is used by the WLAN. More specifically, in case the WLAN is using a $j^{th}$ TV channel, this signifies that the incumbent device is using a $j-1^{th}$ TV channel. At this point, it will be assumed that a $j+1^{th}$ TV channel is not used by the incumbent device.

Case 2 corresponds to a case when the incumbent device is using a TV channel that is adjacent to the right side (higher frequency) of the TV channel that is used by the WLAN. More specifically, in case the WLAN is using a $j^{th}$ TV channel, this signifies that the incumbent device is using a $j+1^{th}$ TV channel. At this point, it will be assumed that a $j-1^{th}$ TV channel is not used by the incumbent device.

Case 3 corresponds to a case when the incumbent device is using TV channels that are adjacent to both the left side (lower frequency) and the right side (higher frequency) of the TV channel that is used by the WLAN. More specifically, in case the WLAN is using a $j^{th}$ TV channel, this signifies that the incumbent device is using a $j-1^{th}$ TV channel and a $j+1^{th}$ TV channel.

1) Channelization Method of a Minimum Bandwidth B HMz

In order to perform channelization of a minimum bandwidth B MHz of a WLAN operating channel, channelization may be differently performed in accordance with each case.

In case of Cases 1 and 2, channelization may be performed in a method that is similar to the method described above in 2.1. More specifically, among TV channels neighboring a TV channel, wherein the operating channel is set, when the incumbent device is using any one of neighboring TV channels, a center frequency of the operating channel may be located to be spaced apart from the center frequency of the TV channel, wherein the operating channel is set, by a predetermined frequency along an opposite direction of the TV channel that is being used by the incumbent device. At this point, the value of the predetermined frequency may be decided by a bandwidth of the TV channel and a minimum frequency bandwidth that is supported by the operating channel. For example, in case of Case 1, the center frequency of the WLAN operating channel is matched to a frequency that is higher than the center frequency of the $j^{th}$ TV channel by (N−B)/2 MHz, and, in case of Case 2, the center frequency of the WLAN operating channel is matched to a frequency that is lower than the center frequency of the $j^{th}$ TV channel by (N−B)/2 MHz.

In case of Case 3, channelization may be performed in a method that is identical to the method described above in 2.2. More specifically, the center frequency of the WLAN operating channel may be matched to a center frequency of a TV channel to which the corresponding operating channel belongs.

Hereinafter, a case when the TV channel bandwidth (N) is equal to 6 MHz, and when a minimum bandwidth of the operating channel is equal to 5 MHz (B), will be given as an example and described accordingly.

Figure 16:
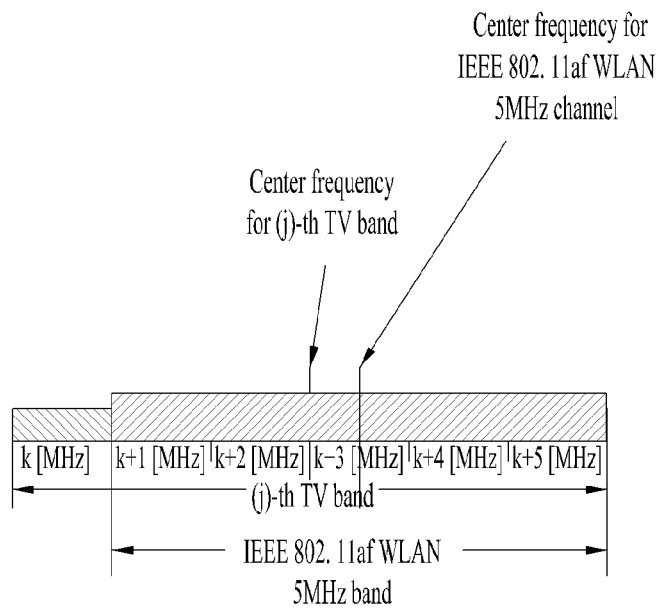
FIG. 16 to FIG. 18 respectively illustrate an exemplary channelization according to the present invention with respect to a case when one TV channel is used.
Figure 17:
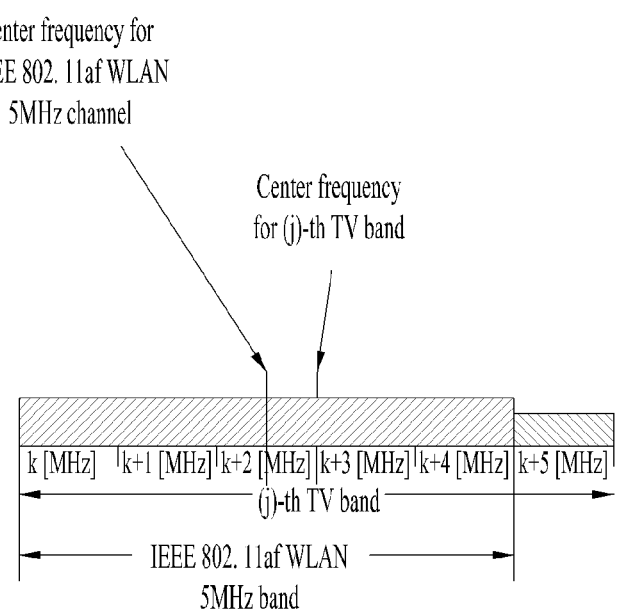
Figure 18:
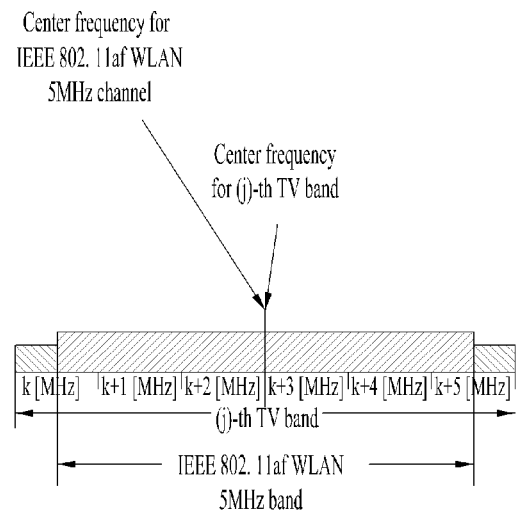

FIG. 16 to FIG. 18 respectively illustrate an exemplary channelization according to the present invention with respect to a case when one TV channel is used.

FIGS. 16 to 18 respectively illustrate an exemplary case when the bandwidth of the WLAN operating channel is equal to 5 MHz, and, for example, the 5 MHz operating channel may be created by down-clocking a 20 MHz channel of IEEE 802.11ac to 4 times or by down-clocking a 40 MHz channel of IEEE 802.11ac to 8 times.

In case the incumbent device is using a TV channel that is adjacent to the left side (lower frequency) of the TV channel that is used by the WLAN (Case 1), FIG. 16 illustrates an exemplary case of matching the center frequency of the operating channel of IEEE 802.11af by performing a shift to a frequency that is higher by ½ MHz(=(6−5)/2 MHz). More specifically, an exemplary case of matching the center frequency of the WLAN operating channel to a frequency that is higher than the center frequency of the TV channel in the $j^{th}$ TV channel by ½ MHz is presented herein.

In case the incumbent device is using a TV channel that is adjacent to the right side (higher frequency) of the TV channel that is used by the WLAN (Case 2), FIG. 17 illustrates an exemplary case of matching the center frequency of the operating channel of IEEE 802.11af by performing a shift to a frequency that is lower by ½ MHz(=(6−5)/2 MHz). More specifically, an exemplary case of matching the center frequency of the WLAN operating channel to a frequency that is lower than the center frequency of the TV channel in the $j^{th}$ TV channel by ½ MHz is presented herein.

In case the incumbent device is using a TV channel that is adjacent to both the left side (lower frequency) and the right side (higher frequency) of the TV channel that is used by the WLAN (Case 3), FIG. 18 illustrates an exemplary case of matching the center frequency of the operating channel of IEEE 802.11af to a center frequency of the TV channel. More specifically, an exemplary case of matching a center frequency of an operating channel in the $j^{th}$ TV channel is presented herein.

2) Channelization Method of Contiguous 2*B MHz

In case the operating channel is defined to have a contiguous form and has a bandwidth of 2*B MHz, channelization may be differently performed in accordance with each of the following cases.

In case of Cases 1 and 2, channelization may be performed in a method that is similar to the method described above in 2.1. More specifically, in case the TV channel, wherein the operating channel is set, corresponds to two contiguous TV channels, the center frequency of the operating channel may be positioned at the edge of the two contiguous TV channels. For example, in case of Case 1, the center frequency of the contiguous 2*B MHz operating channel may be matched to the edge of the $j^{th}$ TV channel and the $j+1^{th}$ TV channel. Additionally, in case of Case 2, the center frequency of the contiguous 2*B MHz operating channel may be matched to the edge of the $j^{th}$ TV channel and the $j−1^{th}$ TV channel. However, in case of Case 3, channelization respective to the contiguous 2*B MHz operating channel cannot be performed.

Hereinafter, a case when the TV channel bandwidth (N) is equal to 6 MHz, and when a minimum bandwidth of the operating channel is equal to 5 MHz (B), will be given as an example and described accordingly.

Figure 19:
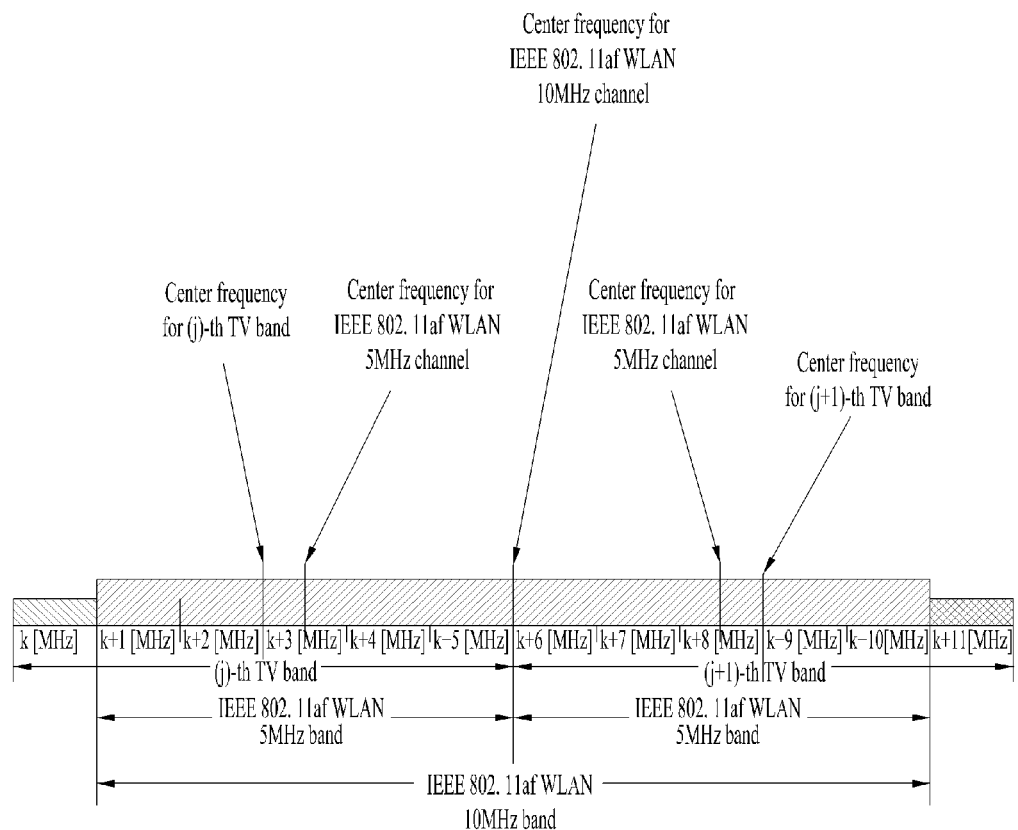
FIG. 19 illustrates an exemplary channelization according to the present invention with respect to a case when two consecutive TV channels are used.

FIG. 19 illustrates an exemplary channelization according to the present invention with respect to a case when two consecutive TV channels are used.

FIG. 19 illustrates exemplary cases when the bandwidth of the WLAN operating channel is equal to contiguous 10 MHz, and, for example, the contiguous 10 MHz operating channel may be created by down-clocking a 40 MHz channel of IEEE 802.11ac to 4 times or by down-clocking a 80 MHz channel of IEEE 802.11ac to 8 times.

Referring to FIG. 19, in case the incumbent device is using a TV channel that is adjacent to the left side (lower frequency) or the right side (higher frequency) of the TV channel that is used by the WLAN (Cases 1 or 2), presented herein is an exemplary case of matching the center frequency of the contiguous 2*B MHz operating channel to the edge of the $j^{th}$ TV channel and the $j+1^{th}$ TV channel.

3) Channelization Method of Contiguous 4*B MHz

In case the operating channel is defined to have a contiguous form and has a bandwidth of 4*B MHz, channelization may be differently performed in accordance with each of the following cases.

In case of Cases 1 and 2, channelization may be performed in a method that is similar to the method described above in 2.1. More specifically, in case the TV channel, wherein the operating channel is set, corresponds to four contiguous TV channels, the center frequency of the operating channel may be positioned at the edge of second and third TV channels of the four contiguous TV channels.

However, in case of Case 1, it will be assumed that both $j+2^{th}$ TV channel and $j+3^{th}$ TV channel are not used by the incumbent device. In this case, the center frequency of the contiguous 4*B MHz operating channel may be matched to the edge of the $j+1^{th}$ TV channel and the $j+2^{th}$ TV channel. Additionally, in case of Case 2, it will be assumed that both $j−2^{th}$ TV channel and $j−3^{th}$ TV channel are not used by the incumbent device. In this case, the center frequency of the contiguous 4*B MHz operating channel may be matched to the edge of the $j−1^{th}$ TV channel and the $j−2^{th}$ TV channel. However, in case of Case 3, channelization respective to the contiguous 4*B MHz operating channel cannot be performed.

Presented above is the description of a channelization method respective to an IEEE 802.11af operating channel having a changed frequency bandwidth, when the frequency bandwidth is changed by down-clocking a frame of IEEE 802.11af.

More specifically, referring back to FIG. 5, an enabling STA that can access the GDB acquires an available channel list from the TVWS band of the region in which the corresponding enabling STA is located by accessing the GDB, as shown step S501, and, then, as shown in step S507 or S513, the enabling STA may notify information on an available TV channel to a dependent STA, which cannot access the GDB.

Herein, the enabling STA may notify the dependent STA which TV channel is available for usage as a band other than the TV band. Additionally, the dependent STA may acquire a beacon frame (or GDC enabling signal) by scanning a channel having all available frequency bandwidths, and the corresponding channel may be used in accordance with a procedure (e.g., step S505 to step S515 in FIG. 5), which is defined in the IEEE 802.11af system with respect to the channel through which the beacon frame is being transmitted. At this point, the center frequency of each operating channel may be defined in accordance with the method that is described above in 2.1. to 2.3., and the dependent STA may perform multiple scanning sessions in accordance with the bandwidth of each operating channel.

Moreover, the dependent STA may perform scanning only on a channel having a minimum bandwidth (e.g., 4 MHz, 5 MHz, or 40/6 MHz=approximately 6.67 MHz), and information on the bandwidth of the operating channel may be acquired from the enabling STA via signaling. For example, just as a frame structure of IEEE 802.11ac, which repeatedly uses a preamble of a frame of 20 MHz as the preamble section of each bandwidth, since a frame structure of IEEE 802.11af, which has down-clocked the frame of IEEE 802.11ac to 5 times (in case of 4 MHz), 4 times or 8 times (in case of 5 MHz), 6 times (in case of 40/6 MHz=approximately 6.67 MHz), repeatedly uses the preamble of a minimum bandwidth (e.g., 4 MHz, 5 MHz, or 40/6 MHz=approximately 6.67 MHz) as the preamble section in which bandwidth, when the dependent STA acquires information on the bandwidth of the operating channel via signaling, the scanning on the operating channel having the corresponding bandwidth may become possible. In this case, the enabling STA may periodically broadcast information on a channel, which is used by the BSS (e.g., bandwidth information of an operating channel), through all minimum bandwidth operating channels that overlap entirely or partially with the channel that is currently used by its own BSS.

2.4. Signaling Method

As described above in the example shown in FIG. 5, the enabling STA device notifies information on an available channel to a dependent STA, and the dependent STA may set an operating channel by using the above-described method. At this point, the method used by the enabling STA device for signaling information on the available channel to the dependent STA may be divided into two different types as described below.

2.4.1. Implicit Method

According to this method, the enabling STA may notify a dependent STA of an available channel or available frequency band of the TVWS, as defined in the FCC or Ofcom, through a WSM, and so on (e.g., step S509 or step S515 in the example of FIG. 5), and the dependent STA may implicitly predict the center frequency in accordance with the following cases through the available channel information. More specifically, the STA may calculate a center frequency by using only the available channel or available frequency band information of the TVWS and may set the WLAN operating channel. Hereinafter, for simplicity in the description, it will be assumed that the above-described method of 2.3. (Embodiment 3) will be used for setting the operating channel, and the description will be made accordingly, however, the description will not be limited only to this, and, therefore, the above-described methods of 2.1. (Embodiment 1) and 2.2. (Embodiment 2) may also be identically applied.

In Case 1 Channel Corresponds to the Available Channel

Among the available channels notified by the enabling STA, in case only one channel has been contiguously notified as the available channel, the STA determines that both channels adjacent to the left side and right side of the one available channel are used by the incumbent device, and the center frequency of the WLAN channel is matched to the center of each available channel. In other words, in the above-described 2.3., this corresponds to the case of Case 3. For example, when the available channel=(5), and when number 4 and number 6 are not included in the available channel list that is being used, the center frequency of the WLAN operating channel is matched to the center frequency of TV channel number 5. Herein, 5 corresponds to the TV channel number, and notification may be made in the form of 5, however, as in the case of Ofcom, the corresponding frequency may be notified in the form of a lower frequency and in the form of a higher frequency, and the STA may be capable of identifying which one corresponds to the respective TV channel through the frequency information.

In Case 2 Contiguous Channels Correspond to the Available Channel

Among the available channels notified by the enabling STA, in case only two channels have been contiguously notified as the available channels, the STA determines that both channels adjacent to the left side and right side of the two consecutive available channels are used by the incumbent device, and the WLAN center frequency is matched to a frequency being higher than the center frequency of the TV channel having the lower number by (N−B)/2 MHz (Case 1 in 2.3.), and the WLAN center frequency is matched to a frequency being lower than the center frequency of the TV channel having the higher number by (N−B)/2 MHz (Case 2 in 2.3.). For example, when the available channel=(5,6), and when number 4 and number 7 are not included in the available channel list that is being used, it is determined that channel number 4 and channel number 7 are both used by the incumbent device, and, in case of channel number 5, the WLAN center frequency is located at a frequency being higher than the center frequency of TV channel number 5 by (N−B)/2 MHz, and, in case of channel number 6, the WLAN center frequency is located at a frequency being lower than the center frequency of TV channel number 6 by (N−B)/2 MHz. In this case, a 2*B MHz WLAN operating channel having a center frequency located at the edge of TV channel number 5 and TV channel number 6 may be additionally configured.

In Case 3 Contiguous Channels Correspond to the Available Channel

Among the available channels notified by the enabling STA, in case only three channels have been contiguously notified as the available channels, the STA determines that both channels adjacent to the left side and right side of the three consecutive available channels are used by the incumbent device, and a 2*B MHz WLAN operating channel is configured by selecting two consecutive available channels from the three available channels, and a B MHz WLAN operating channel may be configured in the remaining one channel.

For example, when the available channel=(5,6,7), and when number 4 and number 8 are not included in the available channel list that is being used, it is determined that channel number 4 and channel number 8 are both used by the incumbent device, and, in case of channel number 5, the WLAN center frequency is located at a frequency being higher than the center frequency of TV channel number 5 by (N−B)/2 MHz (Case 1 in 2.3.), and, in case of channel number 6, the WLAN center frequency is located at a frequency being lower than the center frequency of TV channel number 6 by (N−B)/2 MHz, and, in case of channel number 7, the WLAN center frequency is located either at a frequency being lower than the center frequency of TV channel number 7 by (N−B)/2 MHz or at a center frequency of the TV channel. In this case, a 2*B MHz WLAN operating channel having a center frequency located at the edge of TV channel number 5 and TV channel number 6 may be additionally configured.

Alternatively, in case of channel number 5, the WLAN center frequency is located either at a frequency being higher than the center frequency of TV channel number 5 by (N−B)/2 MHz or at a center frequency of the TV channel, and, in case of channel number 6, channel the WLAN center frequency is located at a frequency being higher than the center frequency of TV channel number 6 by (N−B)/2 MHz, and, in case of channel number 7, the WLAN center frequency is located at a frequency being lower than the center frequency of TV channel number 7 by (N−B)/2 MHz. In this case, a 2*B MHz WLAN operating channel having a center frequency located at the edge of TV channel number 6 and TV channel number 7 may be additionally configured.

In Case K Number of Contiguous Channels Correspond to the Available Channel

Among the available channels notified by the enabling STA, in case only K number of channels have been contiguously notified as the available channels (e.g., K is greater than 4), the STA determines that both channels adjacent to the left side and right side of the K number of consecutive available channels are used by the incumbent device, and a 2*B MHz WLAN operating channel is configured by selecting one or more sets of two consecutive available channels from the K number of available channels, and, in case remaining channels exist, a B MHz WLAN operating channel may be configured in the remaining channels.

First of all, with respect to odd-numbered (or odd number indexed) channels among the available channels (in the above-described example, 5 and 7, and, in case available channel=(4,5,6,7), 4 and 6), the WLAN center frequency is matched to a frequency being higher than the center frequency of the TV channel by (N−B)/2 MHz, and, with respect to even-numbered (or even number indexed) channels among the available channels (in the above-described example, 6 and 8, and, in case available channel=(4,5,6,7), 5 and 7), the WLAN center frequency is matched to a frequency being lower than the center frequency of the TV channel by (N−B)/2 MHz.

For example, when the available channel=(5,6,7,8), and when number 4 and number 9 are not included in the available channel list that is being used, it is determined that channel number 4 and channel number 9 are both used by the incumbent device, and, in case of channel number 5, the WLAN center frequency is located at a frequency being higher than the center frequency of TV channel number 5 by (N−B)/2 MHz, and, in case of channel number 6, the WLAN center frequency is located at a frequency being lower than the center frequency of TV channel number 6 by (N−B)/2 MHz, and the WLAN center frequency is located at a frequency being higher than the center frequency of TV channel number 7 by (N−B)/2 MHz, and the WLAN center frequency is located at a frequency being lower than the center frequency of TV channel number 8 by (N−B)/2 MHz. In this case, two 2*B MHz WLAN operating channels each having a center frequency located at the edge of TV channel number 5 and TV channel number 6 and at the edge of TV channel number 7 and TV channel number 8 may be additionally configured.

As another method, with respect to a first channel among the available channels, the WLAN center frequency is located either at a frequency being higher than the center frequency of TV channel by (N−B)/2 MHz or at a center frequency of the TV channel, and, with respect to a last channel among the available channels, the WLAN center frequency is located either at a frequency being lower than the center frequency of TV channel by (N−B)/2 MHz or at a center frequency of the TV channel. Starting from the second channel, the WLAN center frequency is alternately located at frequencies respectively higher and lower than the center frequency of the TV channel by (N−B)/2 MHz. In other words, in the second channel, the WLAN center frequency is located at a frequency being higher than the center frequency by (N−B)/2 MHz, and, in the third channel, the WLAN center frequency is located at a frequency being lower than the center frequency by (N−B)/2 MHz, and, in the fourth channel the WLAN center frequency is located at a frequency being higher than the center frequency by (N−B)/2 MHz, and so on, and the center frequency of the WLAN operating channel may be matched by using the same method (when K>5).

For example, when the available channel=(5,6,7,8), and when number 4 and number 9 are not included in the available channel list that is being used, it is determined that channel number 4 and channel number 9 are both used by the incumbent device, and, in case of channel number 5, the WLAN center frequency is located either at a frequency being higher than the center frequency of TV channel number 5 by (N−B)/2 MHz or at a center frequency of the TV channel, and, in case of channel number 6, the WLAN center frequency is located at a frequency being higher than the center frequency of TV channel number 6 by (N−B)/2 MHz, and, in case of channel number 7, the WLAN center frequency is located at a frequency being lower than the center frequency of TV channel number 7 by (N−B)/2 MHz, and, in case of channel number 8, the WLAN center frequency is located either at a frequency being lower than the center frequency of TV channel number 8 by (N−B)/2 MHz or at a center frequency of the TV channel. In this case, a 2*B MHz WLAN operating channel having a center frequency located at the edge of TV channel number 6 and TV channel number 7 may be additionally configured.

2.4.2. Explicit Method

According to this method, when the enabling STA notifies a dependent STA of an available channel or available frequency band of each TVWS an available channel, the enabling STA may additionally notify how much the center frequency of the WLAN operating channel has been shifted from the center frequency of the TV channel with respect to bandwidth B (i.e., a minimum bandwidth of an operating channel of WLAN). At this point, a shifted amount (or value) of the center frequency may be notified, for example, as 0, +1, or −1, or may be notified as an absolute value.

First of all, the enabling STA may notify the shifted amount of the center frequency as 0, +1, or −1. More specifically, although the shifted amount of the center frequency may be decided as a multiple of an offset value in a basic frequency unit, the basic frequency unit does not correspond to an absolute value, and the basic frequency unit may be decided by a bandwidth of a TV channel and a minimum frequency bandwidth supported by the operating channel. For example, when the center frequency is located at the center frequency of the TV channel, the shifted amount is notified as 0, and, when the center frequency has shifted to a frequency being higher by (N−B)/2 MHz, the shifted amount is notified as +1, and, when the center frequency has shifted to a frequency being lower by (N−B)/2 MHz, the shifted amount is notified as −1. In this case, the WSM may be configured by adding an offset value as shown below in Table 3.

Table 3 indicates an example of WSM information according to the present invention.

TABLE 3

| Name | Length (Octet) | Value |
| --- | --- | --- |
| Channel Number | 1 | A Channel Number field has a positive integer value (defined by an outside regulation) indicating an available TV channel for WLAN operations. The length of the Channel Number field is equal to 1 octet. When a channel number and maximum power level pair is repeated, the channel number and maximum power level pair is listed by an increasing order of TV channel numbers. |
| Offset | 1 | An Offset field has any one of 0b00000000, 0b00000001, and 0b00000010. When 0b00000000 is selected, the center frequency of the WLAN channel corresponds to a center frequency of a paired channel number. When 0b00000001 is selected, the center frequency of the WLAN channel corresponds to a center frequency of a paired channel number − (N-B)/2 MHz. When 0b00000010 is selected, the center frequency of the WLAN channel corresponds to a center frequency of a paired channel number + (N-B)/2 MHz. |
| Maximum Power Level | 1 | A Maximum (Transmission) Power Level field indicates a maximum allowed power for performing transmission from a channel number in 0.5 dBm units. |

At this point, the channel number and the offset value may be expressed as a single field. More specifically, a predetermined bit of the channel number may be used as the offset value. For example, information of the offset information (00='0', 01='1', or 10='−1') is given by using two MSBs (Most Significant Bits, if the channel number is configured of b1b2b3b4b5b6b7b8, b1 and b2) of a channel number or by using two LSBs (Least Significant Bits, if the channel number is configured of b1b2b3b4b5b6b7b8, b7 and b8) of a channel number, the channel number may be notified by using the remaining bits.

Table 4 indicates an example of WSM information according to the present invention.

TABLE 4

| Channel Number | Offset |
| --- | --- |
| 19 | 0b00000000 |
| 21 | 0b00000010 |
| 22 | 0b00000001 |
| 26 | 0b00000000 |

Referring to Table 4, for simplicity in the description, among the WSM information field, only the channel number and the offset are expressed, and other fields have not been expressed. When it is assumed that the WSM information is being transmitted, as shown in Table 4, the STA may set the operating channel as described below.

First of all, TV channels number 21 and number 22 correspond to 2 available channels being contiguous, and, in case of number 21, since the center frequency is shifted to a higher frequency, and, in case of number 22, since the center frequency is shifted to a low frequency, the center frequency of the 2*B MHz WLAN operating channel may be matched to TV channels number 21 and number 22. Additionally, in case of TV channels number 19 and number 26, since only one channel is available, and since the center frequency of each TV channel is not shifted, the center frequency of the WLAN operating channel is matched to the center frequencies of TV channels number 19 and number 26.

Subsequently, the enabling STA may notify the shifted amount of the center frequency as an absolute amount (or value). For example, in case of shifting an offset (K)*Unit MHz towards a higher frequency, the basic unit is decided in advance (e.g., basic unit=100 kHz), and the K value may be notified. In this case, the center frequency may correspond to an offset value from a starting frequency of the basic frequency unit (at this point, K is equal to a positive number), and the center frequency may also correspond to an offset value from the center frequency of a TV channel. As described above, in case the K value corresponds to the offset value from the center frequency of the TV channel, and in case the shifting is performed to a higher frequency from the center frequency of the TV channel, a positive value may be notified, and, in case the shifting is performed to a lower frequency from the center frequency of the TV channel, a negative value may be notified. In this case, as shown below in Table 5 or Table 6, the WSM information may be configured by adding an Offset value. In case of Table 5, it will be assumed that an offset value from the starting frequency of the TV channel is notified, and, in case of Table 6, it will be assumed that an offset value from the center frequency of the TV channel is notified shown below.

Table 5 indicates an example of WSM information according to the present invention.

TABLE 5

| Name | Length (Octet) | Value |
| --- | --- | --- |
| Channel Number | 1 | A Channel Number field has a positive integer value (defined by an outside regulation) indicating an available TV channel for WLAN operations. The length of the Channel Number field is equal to 1 octet. When a channel number and maximum power level pair is repeated, the channel number and maximum power level pair is listed by an increasing order of TV channel numbers. |

TABLE 5-continued

| Name | Length (Octet) | Value |
|---|---|---|
| Offset | 1 | An Offset field has a positive integer value (K). The center frequency of the WLAN channel is higher than the starting frequency of the paired channel number by K*(unit). |
| Maximum Power Level | 1 | A Maximum (Transmission) Power Level field indicates a maximum allowed power for performing transmission from a channel number in 0.5 dBm units. |

Table 6 indicates an example of WSM information according to the present invention.

TABLE 6

| Name | Length (Octet) | Value |
|---|---|---|
| Channel Number | 1 | A Channel Number field has a positive integer value (defined by an outside regulation) indicating an available TV channel for WLAN operations. The length of the Channel Number field is equal to 1 octet. When a channel number and maximum power level pair is repeated, the channel number and maximum power level pair is listed by an increasing order of TV channel numbers. |
| Offset | 1 | An Offset field has a positive integer value (K). The center frequency of the WLAN channel is higher (when K is a positive number) or lower (when K is a negative number) than the center frequency of the paired channel number. |
| Maximum Power Level | 1 | A Maximum (Transmission) Power Level field indicates a maximum allowed power for performing transmission from a channel number in 0.5 dBm units. |

3. General Description of a Device to Which the Present Invention May be Applied FIG. 20 illustrates a block view showing a structure of a wireless communication device according to an exemplary embodiment of the present invention.

Figure 20:
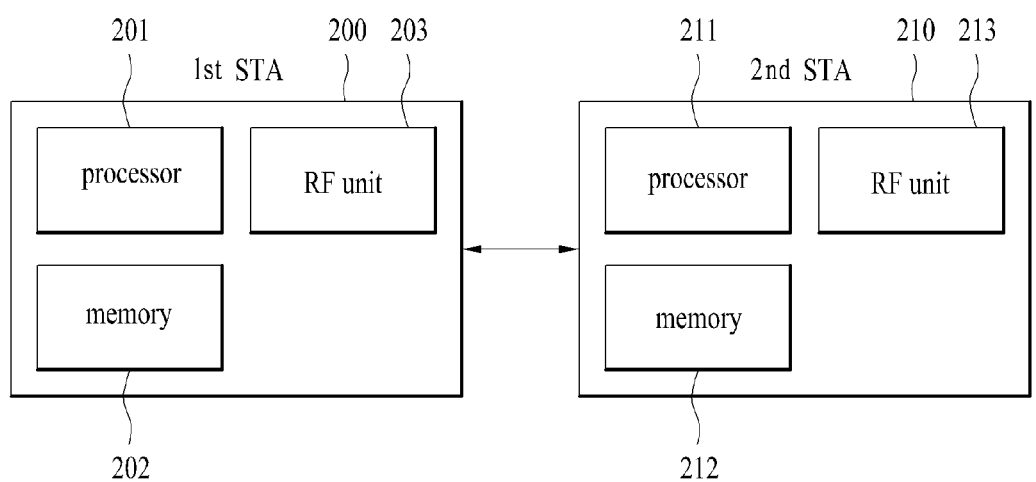
FIG. 20 illustrates a block view showing a structure of a wireless communication device according to an exemplary embodiment of the present invention.

Referring to FIG. 20, a first STA (200) includes a processor (201), a memory (202), and an RF module (203). The processor (201) realizes the proposed functions, procedures, and/or methods. Layer of the wireless interface protocol may be realized by the processor (201). The memory (202) is connected to the processor (201) and stores diverse information for operating the processor (201). The RF unit (203) is connected to the processor (201) and transmits and/or receives radio signals.

A second STA (210) includes a processor (211), a memory (212), and an RF module (213). The processor (211) realizes the proposed functions, procedures, and/or methods. Layer of the wireless interface protocol may be realized by the processor (211). The memory (212) is connected to the processor (211) and stores diverse information for operating the processor (211). The RF unit (213) is connected to the processor (211) and transmits and/or receives radio signals.

The memory (202, 212) may be provided inside or outside of the processor (201, 211) and may be connected to the processor (201, 211) through diverse well-known means. Furthermore, the first STA (200) and/or the second STA (200) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although diverse embodiment solutions according to the present invention are described based upon an example that can be applied to an IEEE 802.11 system, the method of the present invention may also be applied to a variety of other radio access systems in addition to the IEEE 802.11 system.

What is claimed is:

1. A method of a device for setting an operating channel in a white space band, the method comprising:
   receiving, by the device, a White Space Map including information on an available TV channel and an offset value from the available TV channel; and
   setting, by the device, the operating channel based upon the information of the available TV channel and the offset value from the available TV channel,
   wherein the offset value indicates a shifted amount of a center frequency of the operating channel from a center frequency of the available TV channel.

2. The method of claim 1, wherein the shifted amount is decided in basic frequency units as a multiple of the offset value.

3. The method of claim 2, wherein the basic frequency unit is decided as a bandwidth of the TV channel and a minimum frequency bandwidth supported by the operating channel.

4. The method of claim 2, wherein the basic frequency unit is decided as (N−B)/2, where N represents a bandwidth of the TV channel, and B corresponds to a minimum frequency bandwidth supported by an operating channel.

5. The method of claim 1, wherein partial bits of a bit sequence representing information on the available TV channel indicates the offset value.

6. A device setting an operating channel in a white space band, the device comprising:
   a RF (Radio Frequency) transceiver configured to transmit and receive a radio signal; and
   a processor configured to:
      control the RF transceiver;
      receive a White Space Map including information on an available TV channel and an offset value from the available TV channel; and
      set the operating channel based upon the information of the available TV channel and the offset value from the available TV channel,
      wherein the offset value indicates a shifted amount of a center frequency of the operating channel from a center frequency of the available TV channel.

7. The device of claim 6, wherein the shifted amount is decided in basic frequency units as a multiple of the offset value.

8. The device of claim 7, wherein the basic frequency unit is decided as a bandwidth of the TV channel and a minimum frequency bandwidth supported by the operating channel.

9. The device of claim 7, wherein the basic frequency unit is decided as (N−B)/2, where N represents a bandwidth of the TV channel, and B corresponds to a minimum frequency bandwidth supported by an operating channel.

10. The device of claim 6, wherein partial bits of a bit sequence representing information on the available TV channel indicates the offset value.

* * * * *